(12) United States Patent
Tomioka et al.

(10) Patent No.: US 9,405,152 B2
(45) Date of Patent: *Aug. 2, 2016

(54) LIQUID CRYSTAL DISPLAY AND METHOD FOR MANUFACTURING SAME

(71) Applicants: JAPAN DISPLAY INC., Tokyo (JP); PANASONIC LIQUID CRYSTAL DISPLAY CO., LTD., Hyogo-Ken (JP)

(72) Inventors: Yasushi Tomioka, Hitachinaka (JP); Hidetoshi Abe, Hitachinaka (JP); Katsumi Kondo, Mito (JP)

(73) Assignees: JAPAN DISPLAY INC., Tokyo (JP); PANASONIC LIQUID CRYSTAL DISPLAY CO., LTD., Hyogo-Ken (JP)

( * ) Notice: Subject to any disclaimer, the term of this patent is extended or adjusted under 35 U.S.C. 154(b) by 52 days.

This patent is subject to a terminal disclaimer.

(21) Appl. No.: 14/273,648

(22) Filed: May 9, 2014

(65) Prior Publication Data
US 2014/0248445 A1 Sep. 4, 2014

Related U.S. Application Data

(60) Continuation of application No. 13/212,072, filed on Aug. 17, 2011, now Pat. No. 8,758,871, which is a division of application No. 12/781,815, filed on May 18, 2010, now Pat. No. 8,025,939, which is a continuation of application No. 10/537,825, filed as application No. PCT/JP03/15658 on Dec. 8, 2003, now Pat. No. 7,718,234.

(30) Foreign Application Priority Data

Dec. 9, 2002 (JP) ................... 2002-356461

(51) Int. Cl.
*G02F 1/1337* (2006.01)
*G02F 1/1343* (2006.01)
*C09K 19/54* (2006.01)

(52) U.S. Cl.
CPC ........ *G02F 1/133723* (2013.01); *C09K 19/542* (2013.01); *G02F 1/134363* (2013.01);
(Continued)

(58) Field of Classification Search
CPC ............ Y10T 428/10; Y10T 428/1005; Y10T 428/1018; Y10T 428/1023; Y10T 428/1027; Y10T 428/1036; C09K 2019/542; C09K 2019/548; C09D 179/08; G02F 1/133723; G02F 1/133788
See application file for complete search history.

(56) References Cited

U.S. PATENT DOCUMENTS 3,731,986 A 5/1973 Fergason
3,994,567 A 11/1976 Matsuo et al.
(Continued)

FOREIGN PATENT DOCUMENTS

EP 850975 7/1998
EP 1037092 9/2000
(Continued)

OTHER PUBLICATIONS

Japanese Official Action issued Jan. 26, 2010, in Application No. 2003-408382.
(Continued)

*Primary Examiner* — Shean C Wu
(74) *Attorney, Agent, or Firm* — TYPHA IP LLC

(57) ABSTRACT

A liquid crystal display is provided which is capable of reducing the occurrence of defective display due to variations in the initial alignment direction of a liquid crystal alignment control film in a liquid crystal display of an IPS scheme, realizing the stable liquid crystal alignment, providing excellent mass productivity, and having high image quality with a higher contrast ratio. The liquid crystal display has a liquid crystal layer disposed between a pair of substrates, at least one of the substrates being transparent, and an alignment control film formed between the liquid crystal layer and the substrate. At least one of the alignment control films 109 comprises photoreactive polyimide and/or polyamic acid provided with an alignment control ability by irradiation of substantially linearly polarized light.

12 Claims, 8 Drawing Sheets

(52) U.S. Cl.
CPC ..... *C09K2019/548* (2013.01); *G02F 1/133788* (2013.01); *Y10T 428/10* (2015.01); *Y10T 428/1005* (2015.01); *Y10T 428/1018* (2015.01); *Y10T 428/1023* (2015.01); *Y10T 428/1027* (2015.01); *Y10T 428/1036* (2015.01)

(56) References Cited

U.S. PATENT DOCUMENTS

| | | | |
|---|---|---|---|
| 4,345,249 | A | 8/1982 | Togashi |
| 4,835,249 | A | 5/1989 | Gallagher et al. |
| 5,612,450 | A | 3/1997 | Mizushima et al. |
| 5,731,405 | A | 3/1998 | Gibbons et al. |
| 5,756,649 | A | 5/1998 | Mizushima et al. |
| 5,928,733 | A | 7/1999 | Yoneya et al. |
| 5,929,201 | A | 7/1999 | Gibbons et al. |
| 5,940,156 | A | 8/1999 | Nishiguchi et al. |
| 5,969,055 | A | 10/1999 | Nishikawa et al. |
| 5,990,856 | A | 11/1999 | Takeda et al. |
| 6,063,829 | A | 5/2000 | Endou et al. |
| 6,141,078 | A | 10/2000 | Morii et al. |
| 6,242,060 | B1 | 6/2001 | Yoneya et al. |
| 6,294,639 | B1 | 9/2001 | Sawahata et al. |
| 6,312,769 | B1 | 11/2001 | Hiraoka et al. |
| 6,344,889 | B1 | 2/2002 | Hasegawa et al. |
| 6,433,764 | B1 | 8/2002 | Hebiguchi et al. |
| 6,441,880 | B1 | 8/2002 | Utsumi et al. |
| 6,685,997 | B1 | 2/2004 | Murata et al. |
| 6,746,730 | B1 | 6/2004 | Tanioka et al. |
| 7,718,234 | B2 | 5/2010 | Tomioka et al. |
| 7,935,396 | B2 | 5/2011 | Matsumori et al. |
| 8,025,939 | B2 | 9/2011 | Tomioka et al. |
| 8,758,871 | B2 * | 6/2014 | Tomioka ........... G02F 1/133723 252/299.4 |
| 2001/0012081 | A1 | 8/2001 | Chaudhari et al. |
| 2001/0046570 | A1 | 11/2001 | Gibbons et al. |
| 2001/0048498 | A1 | 12/2001 | Tomioka et al. |
| 2004/0012725 | A1 | 1/2004 | Tomioka et al. |
| 2005/0271833 | A1 | 12/2005 | Matsumori et al. |
| 2007/0160778 | A1 | 7/2007 | Matsumori et al. |

FOREIGN PATENT DOCUMENTS

| | | |
|---|---|---|
| JP | 63-21907 | 5/1988 |
| JP | 6-160878 | 6/1994 |
| JP | 6-202127 | 7/1994 |
| JP | 7-36047 | 2/1995 |
| JP | 7-209650 | 8/1995 |
| JP | 7-209653 | 8/1995 |
| JP | 07-287235 | 10/1995 |
| JP | 8-36183 | 2/1996 |
| JP | 9-73101 | 3/1997 |
| JP | H9-90367 A | 4/1997 |
| JP | 9-297313 | 11/1997 |
| JP | 10-307295 | 11/1998 |
| JP | H10-307295 A | 11/1998 |
| JP | 11-218765 | 8/1999 |
| JP | 11-264982 | 9/1999 |
| JP | 2000-080164 | 3/2000 |
| JP | 2000-319510 | 11/2000 |
| JP | 2001-281671 | 10/2001 |
| JP | 2001-517317 | 10/2001 |
| JP | 2002-131751 | 5/2002 |
| JP | 3303766 | 5/2002 |
| JP | 2002-229039 A | 8/2002 |
| JP | 2002-258262 | 9/2002 |
| JP | 2002-258303 | 9/2002 |
| JP | 2002-303870 A | 10/2002 |
| JP | 2003-73471 | 3/2003 |
| JP | 2003-255349 | 9/2003 |
| TW | 473497 | 1/2002 |
| WO | WO 91/10936 | 7/1991 |

OTHER PUBLICATIONS

W. M. Gibbons, et al., Nature, 351, pp. 49-50 (May 2, 1991).

Kim et al., "A method for liquid crystal alignment using in situ ultraviolet exposure during imidization of polyimide" Applied Physics Letters, Dec. 7, 1998, pp. 3372-3374, vol. 73 No. 23, American Institute of Physics, College Park, Maryland, United States. Cited in the Petition for Inter Partes Review for U.S. Pat. No. 7,718,234 and U.S. Pat. No. 8,758,871.

Hoogboom et al., "LCD alignment layers. Controlling nematic domain properties", Journal of Materials Chemistry, Nov. 24, 2005, pp. 1305-1314, vol. 16, Royal Society of Chemistry, United Kingdom. Cited in the Petition for Inter Partes Review for U.S. Pat. No. 7,718,234 and U.S. Pat. No. 8,758,871.

Stöhr et al., "Liquid crystal alignment by rubbed polymer surfaces: a mocroscopic bond orientation model", Journal of Electron Spectroscopy and Related Phenomena, Dec. 26, 1999, pp, 189-207, vol. 98-99, Elsevier, Amsterdam, Netherlands. Cited in the Petition for Inter Partes Review for U.S. Pat. No. 7,718,234 and U.S. Pat. No. 8,758,871.

Kawamoto, "The History of Liquid-Crystal Displays", Proceedings of the IEEE, Apr. 2002, pp. 460-500, vol. 90 No. 4, Institute of Electrical and Electronics Engineers, New Jersey, United States. Cited in the Petition for Inter Partes Review for U.S. Pat. No. 7,718,234 and U.S. Pat. No. 8,758,871.

Andrienko et al., Control of the Anchoring Energy of Rubbed Polyimide Layers by Irradiation with Depolarized UV-Light, Japanese Journal of Applied Physics., Mar. 2000, pp. 1217-1220, vol. 39 Part 1 No. 3A, Japan Society of Applied Physics, Japan. Cited in the Petition for Inter Partes Review for U.S. Pat. No. 7,718,234 and U.S. Pat. No. 8,758,871.

Kim et al., "Thermal Stability of Liquid Crystal Alignment Layers Prepared by In-Situ Ultra-Violet Exposure during Imidization of Polyimide", Japanese Journal of Applied Physics, Apr. 2001, pp. 2381-2386, vol. 40, Part 1 No. 4A, Japan Society of Applied Physics, Japan. Cited in the Petition for Inter Partes Review for U.S. Pat. No. 7,718,234 and U.S. Pat. No. 8,758,871.

Nishikawa et al., "Mechanism of Unidirectional Liquid-Crystal Alignment on Polyimides with Linearly Polarized Ultraviolet Light Exposure", Applied Physics Letter, May 11, 1998, pp. 2403-2405, vol. 72, No. 19, Chemical Physics Publications, Kent, Ohio, United States. Cited in the Petition for Inter Partes Review for U.S. Pat. No. 7,718,234 and U.S. Pat. No. 8,758,871.

Kim et al., "Alignment of Liquid Crystals on Polyimide Films Exposed to Ultraviolet Light", Physical Review E, May 5, 1998, pp. 5644-5650, vol. 57, No. 5, Physics Publications, Kent, Ohio, United States. Cited in the Petition for Inter Partes Review for U.S. Pat. No. 7,718,234 and U.S. Pat. No. 8,758,871.

Park et al., "Thermal and Optical Stabilities of Photoisomerizable Polyimide Layers for Nematic Liquid Crystal Alignments", Japanese Journal of Applied Physics, Oct. 1998, pp. 5663-5668, vol. 37, Part 1, No. 10, Japan Society of Applied Physics, Japan. Cited in the Petition for Inter Partes Review for U.S. Pat. No. 7,718,234 and U.S. Pat. No. 8,758,871.

Nishikawa et al., "Effect of Chemical Structures on Polyimides on Unidirectional Liquid Crystal Alignment Produced by a Polarized Ultraviolet-Light Exposure", Japanese Journal of Applied Physics, Mar. 15, 1999, pp. L334-L337, vol. 38, Part 2 No. 3B, Japan Society of Applied Physics, Japan, Cited in the Petition for Inter Partes Review for U.S. Pat. No. 7,718,234 and U.S. Pat. No. 8,758,871.

Nishikawa et al., "Effect of Chemical Structures of Polimides on Unidirectional Liquid Crystal Alignment using a Single Linearly Polarized UV Exposure", Molecular Crystals and Liquid Crystals, Dec. 1998, pp. 63-78, Gordon and Breach Science Publishers, Nevada, United States. Cited in the Petition for Inter Partes Review for U.S. Pat. No. 7,718,234 arid U.S. Pat. No. 8,758,871.

Rabilloud, "Alignment Layers for Liquid Crystal Displays", High-Performance Polymers, 2000, Chapter 7, vol. 3, Editions Technip, Paris, France. Cited in the Petition for Inter Partes Review for U.S. Pat. No. 7,718,234 and U.S. Pat. No. 8,758,871.

Nishikawa et al., "Effects of Chemical Structures of Polyimides on Photo-Alignment of Liquid Crystals", Molecular Crystals and Liquid Crystals, Oct. 18, 1999, pp. 165-179, vol. 333, Gordon and Breach Science Publishers, Nevada, United States. Cited in the Petition for Inter Partes Review for U.S. Pat. No. 7,718,234 and U.S. Pat. No. 8,758,871.

(56) References Cited

OTHER PUBLICATIONS

Nishikawa et al., "Effect of chemical structures of polyimides on photosensitivity of liquid crystal alignment using a polarized UV exposure", Liquid Crystals, Apr. 1999, pp. 575-580, vol. 26, No. 4, Taylor & Francis, Oxfordshire, United Kingdom, Cited in the Petition for Inter Partes Review for U.S. Pat. No. 7,718,234 and U.S. Pat. No. 8,758,871.

Nishikawa et al., "Generation of Pretilt Angles on Polyimides with a Single Linearly Polarized UV Exposure", Molecular Crystals and Liquid Crystals, Jul. 19, 1998, pp. 579-587, vol. 329, Gordon and Breach Science Publishers, Nevada, United States, Cited in the Petition for Inter Partes Review for U.S. Pat. No. 7,718,234 and U.S. Pat. No. 8,758,871.

Nishikawa et al., "11.1: Polyimide Films Designed to Produce High Pretilt Angles with a Single Linearly Polarized UV Exposure", Society for Information Display 98 Digest, 1998, pp. 131-134, vol. 29, Liquid Crystal Institute, Kent State University, Kent, Ohio, United States. Cited in the Petition for Inter Partes Review for U.S. Pat. No. 7,718,234 and U.S. Pat. No. 8,758,871.

Acharya et al., "Material-Independent Determination of Anchoring Properties on a Rubbed Poiyimide Surfaces", Physical Review E, Dec. 15, 1999, pp. 6841-6846, vol. 60, No. 6, Physics Publications, Kent, Ohio, United States. Cited in the Petition for Inter Partes Review for U.S. Pat. No. 7,718,234.

Partial English Translation of the request for a trial for invaiidation submitted by a third party for corresponding Chinese Patent Application. (Mailing date is Feb. 29, 2016).

* cited by examiner

LIQUID CRYSTAL DISPLAY AND METHOD FOR MANUFACTURING SAME

This application is a Continuation Application of application Ser. No. 13/212,072, filed Aug. 17, 2011, now allowed, which is a Divisional application of application Ser. No. 12/781,815, filed May 18, 2010, now U.S. Pat. No. 8,025,939, which is a Continuation application of application Ser. No. 10/537,825, filed Jun. 8, 2005, now U.S. Pat. No. 7,718,234, the contents of each of which are incorporated herein by reference in their entirety. Ser. No. 10/537,825 is a National Stage application, filed under 35 USC 371, of International (PCT) Application No. PCT/JP03/15658, filed Dec. 8, 2003.

TECHNICAL FIELD

The present invention relates to a liquid crystal display of a so-called IPS (In-Plane Switching) scheme in which an electric field substantially in parallel with a substrate is applied to a liquid crystal layer for operation, and to a production process thereof.

BACKGROUND ART

In general, display of a liquid crystal display is realized by applying an electric field to liquid crystal molecules in a liquid crystal layer sandwiched between a pair of substrates to change the alignment direction of the liquid crystal molecules and utilizing the resulting change in the optical property of the liquid crystal layer. Conventionally, a liquid crystal display of a so-called active drive type having a switching device such as a thin-film transistor for each pixel is represented by a TN (Twisted Nematic) display scheme in which an electrode is provided for each of a pair of substrates sandwiching a liquid crystal layer between them, the direction of an electric field applied to the liquid crystal layer is set to be substantially perpendicular to the interface between the substrates, and the optical rotatory power of the liquid crystal molecules constituting the liquid crystal layer is utilized to achieve display. In the liquid crystal display of the TN scheme, a small viewing angle is regarded as the greatest problem.

On the other hand, "Patent Document 1," "Patent Document 2," "Patent Document 3," "Patent Document 4," "Patent Document 5" and the like have disclosed an IPS scheme in which an inter-digital electrode formed on one of a pair of substrates is used to produce an electric field having a component substantially in parallel with the substrate surface to rotate liquid crystal molecules constituting a liquid crystal layer in a plane substantially in parallel with the substrate and the birefringence of the liquid crystal layer is used to realize display. The IPS scheme has advantages such as a wider viewing angle and a lower load capacity due to the in-plane switching of the liquid crystal molecules as compared with the conventional TN scheme. The IPS scheme is considered as a new and promising liquid crystal display which will replace the TN scheme and has made rapid advances in recent years. In addition, another type of the IPS scheme has been disclosed in "Patent Document 6" in which at least one of paired electrodes for applying an electric field to a liquid crystal layer is made of a transparent conductive film to improve transmittance.

The liquid crystal display of the IPS scheme (abbreviated as IPS-TFT-LCD) with favorable viewing angle characteristics (luminance contrast ratio, tone and color reversal) and bright display represents prospective technology for monitors or televisions with a large display area. In the liquid crystal display, an alignment control film provided with a liquid crystal alignment control ability is formed on the interface between a liquid crystal layer and each of a pair of substrates sandwiching the liquid crystal layer between them. However, to put IPS-TFT-LCDs for supporting large screens of 20 inches or more into practice use in the future, it is necessary to develop a new structure and process for large-size displays (large panels).

In particular, for an IPS-TFT-LCD having many stepped structures on a surface opposite to a liquid crystal layer, it is difficult to perform uniform alignment processing on an alignment control film over a large screen. A margin in performing the alignment processing on the alignment control film is significantly smaller than that of the conventional TN scheme, especially a normally open type TN scheme which is predominant at present (bright display at low voltage and dark display at high voltage). The reasons for the small margin include three points described below as (1) to (3).

(1) Stepped Structure

In the IPS-TFT-LCD, it is necessary to provide a number of elongated electrodes (which may be referred to as inter digital electrodes) having a width of approximately several microns in principle. This causes minute stepped structures to be formed therein. The height of the step depends on the thickness of the electrodes or the shapes of various films formed thereon, and typically is equal to 0.1 micron (mµ) or larger. An alignment control film (also referred to as an alignment film) made of a polymer film such as polyimide is formed in the uppermost layer of those films.

In conventional mass production technology, the alignment control film is subjected to rubbing processing to provide a liquid crystal alignment ability (initial alignment). Meanwhile, a cloth for the rubbing is formed by binding thin fibers with a thickness of approximately 10 to 30 microns. Essentially, each of the thin fibers provides shearing force in a predetermined direction for a local portion of the alignment film to perform the processing of giving the liquid crystal alignment ability. While very thin fibers of approximately several microns are present as the fibers, such very thin fibers have not been put into practical use since rigidity for providing certain frictional force is required for the rubbing. The interval between the electrodes in the IPS scheme is approximately 10 to 30 microns which is substantially the same as the diameter of the fibers, so that sufficient rubbing is not performed near the steps and misalignment tends to occur. The misalignment leads to reduced image quality such as a higher black level, an associated lower contrast ratio, and uneven luminance.

(2) Alignment Angle

In the IPS-TFT-LCD, the initial alignment direction needs to be set in principle at a certain angle or more shifted from the direction in which the electrode extends or the direction perpendicular thereto. The electrode refers to a signal wiring electrode, a common electrode in pixels, and a pixel electrode. The definition of the initial alignment direction through the rubbing requires the fibers of approximately 10 to 30 microns to rub in a predetermined angular direction as described above. However, the step of the wire such as the signal wiring electrode, the common electrode in pixels, or the pixel electrode extending in a certain direction at their ends draws the fibers toward the step front the set angle to produce misalignment, thereby reducing image quality such as a higher black level.

(3) Expression of Dark Level

One of the characteristics of the IPS-TFT-LCD is excellent expression of a dark level (black display). Thus, misalignment is easily noticeable as compared with the other schemes. In the conventionally normally open type TN scheme, the dark level is provided while a high voltage is applied. In this case, most of liquid crystal molecules align in the direction of the electric field which is one direction perpendicular to the substrate surface at a high voltage, and the dark level is provided from the relationship between the arrangement of the liquid crystal molecules and the placement of a polarizing plate. Thus, the uniformity of the dark level hardly depends on the initial alignment state at a low voltage in principle. In addition, since human eyes recognize uneven luminance as a relative ratio of luminance and make response close to a logarithmic scale, they are sensitive to variations in the dark level. From this viewpoint, the conventional normally open type TN scheme in which the liquid crystal molecules are forcedly arranged in one direction at a high voltage is advantageous in that it is not sensitive to the initial alignment state.

On the other hand, in the IPS scheme, display of a dark level is performed at a low voltage or no voltage, so that it is sensitive to disturbance of the initial alignment state. In particular, when homogeneous alignment is used in which the alignment directions of liquid crystal molecules are in parallel with each other on an upper substrate and a lower substrate, and the light transmission axis of one of polarizing plates is set in parallel with the alignment direction of the liquid crystal molecules and the light transmission axis of other polarizing plate is set orthogonally thereto (called a birefringence mode), polarized light incident on the liquid crystal layer is transmitted with almost no disturbance of lineal polarization. This is effective in providing excellent expression of the dark level.

The transmittance T in the birefringence mode is expressed by the following equation:

$$T = T_0 \cdot \sin^2\{2\theta(E)\} \cdot \sin^2\{(\pi \cdot d_{\it{eff}} \cdot \Delta n)/\lambda\}$$

where $T_0$ represents a coefficient which is a numerical value determined mainly by the transmittance of the polarizing plate for use in the liquid crystal panel, $\theta(E)$ represents an angle between the alignment direction of liquid molecules (the effective optical axis of the liquid crystal layer) and the polarized light transmission axis, E represents an applied electric field intensity, $d_{\it{eff}}$ represent the effective thickness of the liquid crystal layer, $\Delta n$ represents the refractive index anisotropy of liquid crystal, and $\lambda$ represents the wavelength of light. The product of the effective thickness de, of the liquid crystal layer and the refractive index anisotropy $\Delta n$ of the liquid crystal, that is, $d_{\it{eff}} \cdot \Delta n$ is called retardation. The thickness $d_{\it{eff}}$ of the liquid crystal layer does not refer to the thickness of the whole liquid crystal layer but corresponds to the thickness of the liquid crystal layer which actually changes in the alignment direction when a voltage is applied thereto. This is because the liquid crystal molecules near the interface of the liquid crystal layer do not change in the alignment direction due to the influence of anchoring at the interface even when a voltage is applied thereto. Thus, assuming the thickness of the whole liquid crystal layer sandwiched between the substrates is $d_{LC}$, the relationship $d_{\it{eff}} < d_{LC}$ is always found between the thicknesses $d_{LC}$ and $d_{\it{eff}}$. The difference between them can be estimated at approximately 20 nm to 40 nm, although it depends on the liquid crystal material used in the liquid crystal panel and the type of the interface in contact with the liquid crystal layer, for example the material of the alignment film.

As apparent from the above equation, the term $\sin^2\{2\theta(E)\}$ depends on the electric field intensity, and the luminance can be adjusted by changing the angle $\theta$ in accordance with the electric field intensity E. For the normally close type, polarizing plates are set to satisfy $\theta=0$ when no voltage is applied, and it is sensitive to disturbance of the initial alignment direction.

In this manner, the uniformity of alignment is a very important factor in the IPS scheme, and problems in the currently used rubbing technique have become apparent. In general, the rubbing alignment processing includes many problems associated with the rubbing processing technique such as TFT breakage due to static electricity produced by friction, unfavorable display due to misalignment from disordered fiber ends of a rubbing cloth or dust, and the need for frequent exchanges of rubbing cloths. For the purpose of solving the problems associated with the rubbing alignment processing, a so-called "rubbing-less" alignment technique for aligning liquid crystal molecules without the rubbing has been studied and various processes thereof have been proposed. Among other things, a process has been proposed in which polarized ultraviolet rays or the like are irradiated to the surface of a polymer film to align liquid crystal molecules without the rubbing.

As an example, a process disclosed in "Non-Patent Document 1" is characterized in that it does not require the conventional rubbing processing and realizes the alignment of liquid crystal molecules in a predetermined direction through irradiation of polarized light. The process is advantageous in presenting no problems such as damages on the film surface and static electricity associated with the rubbing technique and providing a simpler production process in view of industrial production. The process has attracted attention as a new liquid crystal alignment processing process without using the rubbing processing.

As a material of the liquid crystal alignment film used in the previous reports, the use of a polymer compound having a photoreactive group in the side chain of a polymer has been proposed for the need to provide photochemical sensitivity to polarized light. A representative example thereof is polyvinylcinnamate, in which case it is thought that dimerization in the side chain through light irradiation develops anisotropy in a polymer film to align the liquid crystal. Another proposal involves dispersing low-molecular dichroic azo dye in a polymer material and irradiating a film surface with polarized light to allow the alignment of liquid crystal molecules in a predetermined direction. In addition, the alignment of liquid crystal molecules achieved by irradiating a particular polyimide film with polarized ultraviolet rays or the like has been reported. In this case, it is contemplated that the light irradiation decomposes the polyimide main chain in a certain direction to develop the liquid crystal alignment.

Patent Document 1: JP-B-63-21907
Patent Document 2: U.S. Pat. No. 4,345,249
Patent Document 3: WO91/10936
Patent Document 4: JP-A-6-22739
Patent Document 5: JP-A-6-160878
Patent Document 6: JP-A-9-73101
Patent Document 7: Japanese Patent No. 3303766
Patent Document 8: JP-A-11-218765
Non-Patent Document 1: W. M. Gibbons et al., Nature, 351, 49(1991)

DISCLOSURE OF THE INVENTION

In this manner, the photo-alignment process through light irradiation has been proposed and studied as the rubbing-less alignment technique for solving the problems in the rubbing alignment technique, but it has the following problems from a practical standpoint. In a polymeric material obtained by introducing a photoreactive group in the side chain of a polymer represented by polyvinylcinnamate, the heat stability of alignment is insufficient and satisfactory reliability is not ensured from a practical viewpoint. In this case, since it is thought that the side chain of the polymer corresponds to the site of the structure which develops the alignment of liquid crystal, it is difficult to say that the technique is preferable in providing more uniform alignment of liquid crystal molecules and more resistant alignment. When low-molecular dichroic dye is dispersed in a polymer, the dye itself for aligning liquid crystal is the low molecular substance, and from the viewpoint of practical use, problems remain in terms of reliability for heat and light.

In addition, in the process of irradiating particular polyimide with polarized ultraviolet rays, the polyimide itself is reliable in heat resistance or the like, but it is thought that the alignment mechanism is caused by decomposition through the light, and it is thus difficult to ensure sufficient reliability for practical use. Specifically, when the liquid crystal alignment with the polarized light irradiation is applied in the future, it is necessary not only to initially align the liquid crystal but also to develop more stable alignment from the viewpoint of reliability. In view of actual industrial application, selection of a thermally stable polymer structure is desired. From those points, the polymer material proposed conventionally for the liquid crystal alignment through light irradiation is not sufficient in the alignment property and the stability, which actually presents a significant problem in realizing the rubbing-less alignment through light irradiation.

Thus, it is an object of the present invention to provide, particularly, a large-sized liquid crystal display capable of solving the inherent problem of the small production margin in the alignment processing in the IPS-TFT-LCD described above, reducing the occurrence of defective display due to variations in the initial alignment direction, realizing the stable liquid crystal alignment, and having high image quality with a higher contrast ratio. It is another object of the present invention to provide a process of producing a high-quality and high-definition liquid crystal display with excellent mass productivity.

To achieve the abovementioned objects, the present invention provides a liquid crystal display comprising: a pair of substrates, at least one of the substrates being transparent; a liquid crystal layer disposed between the pair of substrates; a group of electrodes formed on one of the pair of substrates for applying an electric field having a component substantially in parallel with a surface of the substrate to the liquid crystal layer; a plurality of active devices connected to the group of electrodes; an alignment control film disposed between the liquid crystal layer and at least one of the pair of substrates; and optical means formed on at least one of the pair of substrates for changing the optical property of the liquid crystal layer in accordance with an alignment state of molecules of said liquid crystal layer, wherein at least one of the alignment control films is an alignment control film comprising photoreactive polyimide and/or polyamic acid provided with an alignment control ability by irradiation of substantially linearly polarized light.

The present invention is characterized in that liquid crystal molecules in the liquid crystal layer on the alignment control film have a long axis in a direction orthogonal to a polarization axis of the substantially linearly polarized light for irradiation. In particular, it is desirable that the photoreactive alignment control film is polyamic acid or polyimide comprising at least cyclobutanetetracarboxylic acid dianhydride as acid anhydride and at least aromatic diamine as diamine.

The present invention is characterized in that the cyclobutanetetracarboxylic acid dianhydride and its derivative are a compound represented by a formula [17]:

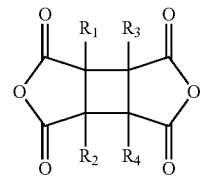

[17]

where $R_1$, $R_2$, $R_3$, $R_4$ each represent a hydrogen atom, a fluorine atom, an alkyl group or alkoxyl group with a carbon number of 1 to 6.

On the other hand, the aromatic diamine compound contains at least one of compounds selected from a group of compounds consisting of ones represented by formulas [18] to [32]:

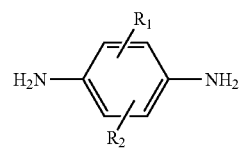

[18]

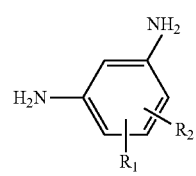

[19]

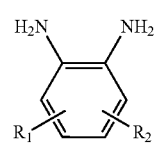

[20]

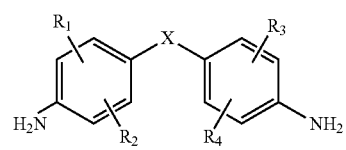

[21]

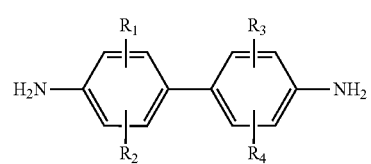

[22]

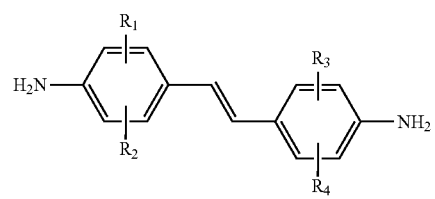

[23]

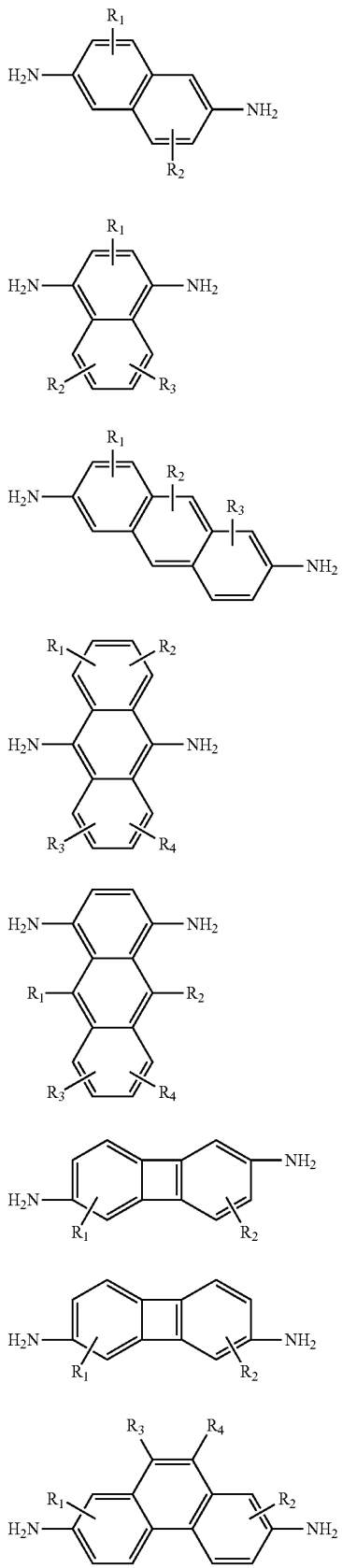

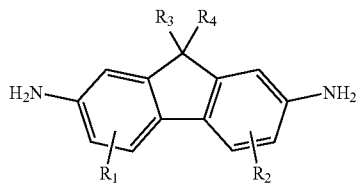

where $R_1$, $R_2$, $R_3$, $R_4$ each represent a hydrogen atom, a fluorine atom, an alkyl group or alkoxyl group with a carbon number of 1 to 6, or a vinyl group {—$(CH_2)_m$—CH=$CH_2$, m=0, 1, 2} or an acetyl group {—$(CH_2)_n$—C≡CH, n=0, 1, 2}, and in the formula [5], X represents a bond group —S—, —CO—, —NH—.

When the alignment control film is formed as a thin film having a thickness from 1 nm to 100 nm, the light transmittance is improved and the efficiency of light reaction with polarized light irradiation is effectively improved. In addition, when the liquid crystal display is produced, the voltage for driving the liquid crystal is effectively applied to the liquid crystal layer. Furthermore, when the alignment control film on the electrode is formed as a thin film having a thickness from 1 nm to 50 nm, and even from 1 nm to 30 nm, it is possible to reduce a direct current voltage component (a so-called residual DC voltage) remaining between the electrode/alignment control film/liquid crystal layer/alignment control film/electrode in each pixel of the liquid crystal display, and after-image and persistence characteristics are effectively enhanced.

In addition, the present invention is characterized in that the liquid crystal layer of the liquid crystal display has a pretilt angle equal to or smaller than one degree. In the conventional rubbing alignment technique, the end of the electrode step acts as a guide for the fibers of a rubbing cloth to draw the fibers in the direction in which the step extends, and the fibers do not extend to the corner of the step, which may prevent the alignment processing to cause misalignment. In particular, when at least one of a pixel electrode, a common electrode, and a common electrode wire is formed of a transparent electrode, the alignment state near the electrode step is easily recognized, and the present invention is effective. Especially, when the transparent electrode is formed of an ion-doped titanium oxide film or an ion-doped zinc oxide film (ZnO), the present invention effectively works. When the pixel electrode and the common electrode opposite thereto are arranged in parallel with each other and formed of zigzag bending structures, the adhesion of the liquid crystal alignment film to an underlying organic insulating film may be poor, and the conventional rubbing alignment processing may cause defective display such as stripping of the alignment film. In such a case, the present invention is effective.

The present invention is particularly effective when the common electrode and/or the pixel electrode is formed on the organic insulating film and the liquid crystal alignment film is formed on the organic insulating film and the electrodes. In addition, the present invention is characterized in that the liquid crystal molecules have substantially the same alignment control directions at two interfaces between the liquid crystal layer and the alignment control film formed on each of the paired substrates.

The present invention is characterized in that the liquid crystal alignment processing is performed by irradiating the liquid crystal alignment film with polarized light. The present invention is characterized in that the polarized light used in the alignment processing has a wavelength range from 200 to 400 nm. In addition, the present invention is more effective when polarized light with at least two wavelengths, that is, substantially linearly polarized light with a first wavelength and light with a second wavelength are used in the alignment processing.

The present invention is also characterized in that the liquid crystal alignment film has a glass transition temperature equal to or higher than 250° C. The present invention more effectively functions by applying at least one processing of heating, irradiation of infrared rays, irradiation of far infrared rays, irradiation of electron beams, and irradiation of radioactive rays when the irradiation of the liquid crystal alignment film with the polarized light is performed to provide the liquid crystal alignment ability. When the liquid crystal alignment ability is provided by irradiating the liquid crystal alignment film with the polarized light, the heating, irradiation of infrared rays, irradiation of far infrared rays, irradiation of electron beams, or irradiation of radioactive rays is performed to accelerate the provision of the liquid crystal alignment ability through the polarized light irradiation and induce cross-link reaction or the like, thereby effectively promoting and stabilizing the liquid crystal alignment ability. Especially, at least one processing of heating, irradiation of infrared rays, irradiation of far infrared rays, irradiation of electron beams, and irradiation of radioactive rays is performed to overlap in time with the irradiation of polarized light, so that the present invention more effectively functions.

The present invention effectively works by performing imidation calcination processing of the alignment control film to overlap in time with the irradiation of polarized light. In particular, when at least one processing of heating, irradiation of infrared rays, irradiation of far infrared rays, irradiation of electron beams, and irradiation of radioactive rays is performed in addition to the polarized light irradiation of the liquid crystal alignment film, it is desirable to set the temperature of the alignment control film in a range from 100 to 400° C., and more preferably, from 150 to 300° C. It is possible and effective that the processing of heating, irradiation of infrared rays, irradiation of far infrared rays also serves as the imidation calcination (firing) processing.

In the present invention, the target contrast ratio is equal to or higher than 500:1, and the target time for eliminating after-image is equal to or shorter than five minutes. The time for eliminating after-image is determined by a process defined in the following embodiments.

BEST MODE FOR CARRYING OUT THE INVENTION

Embodiments of the present invention will hereinafter be described in detail with reference to the drawings. In the following, a substrate which has active devices such as thin film transistors formed thereon is referred to as an active matrix substrate. When an opposite substrate has a color filter thereon, this is referred to as a color filter substrate.

Figure 1:
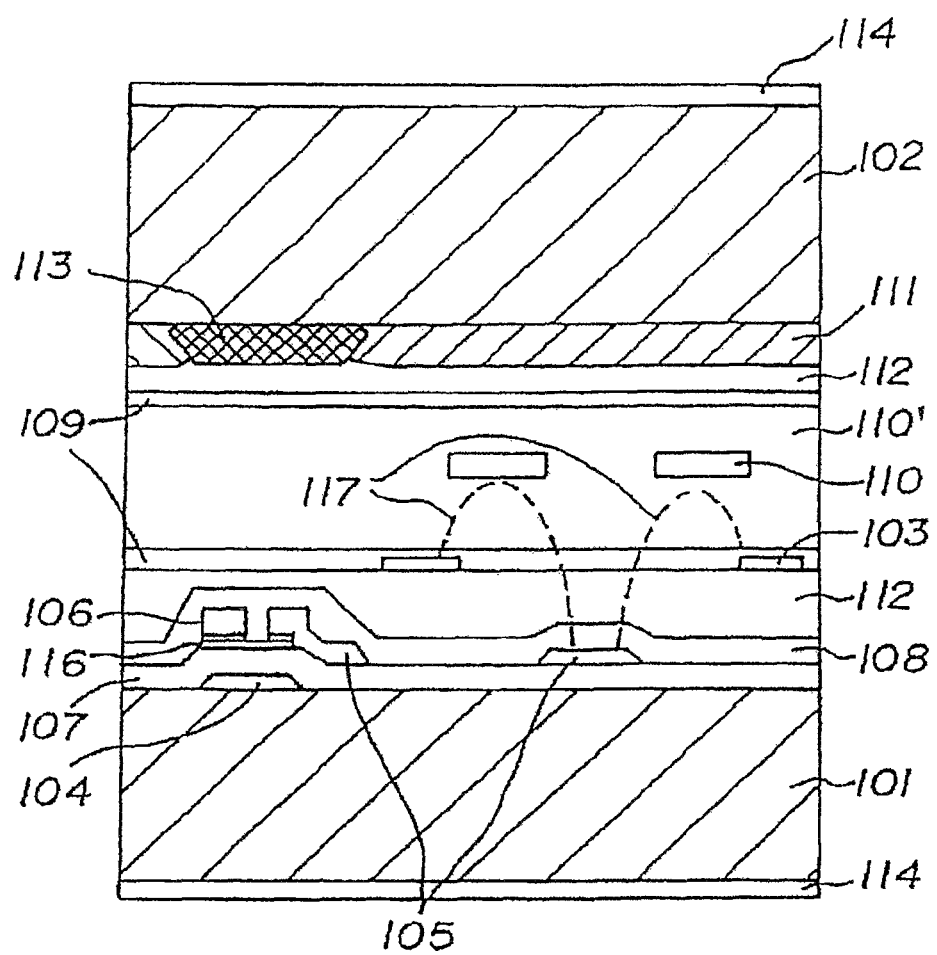
FIG. 1 is a section view showing a pixel portion for explaining the pixel structure of Embodiment 1 of a liquid crystal display according to the present invention.
Figure 2:
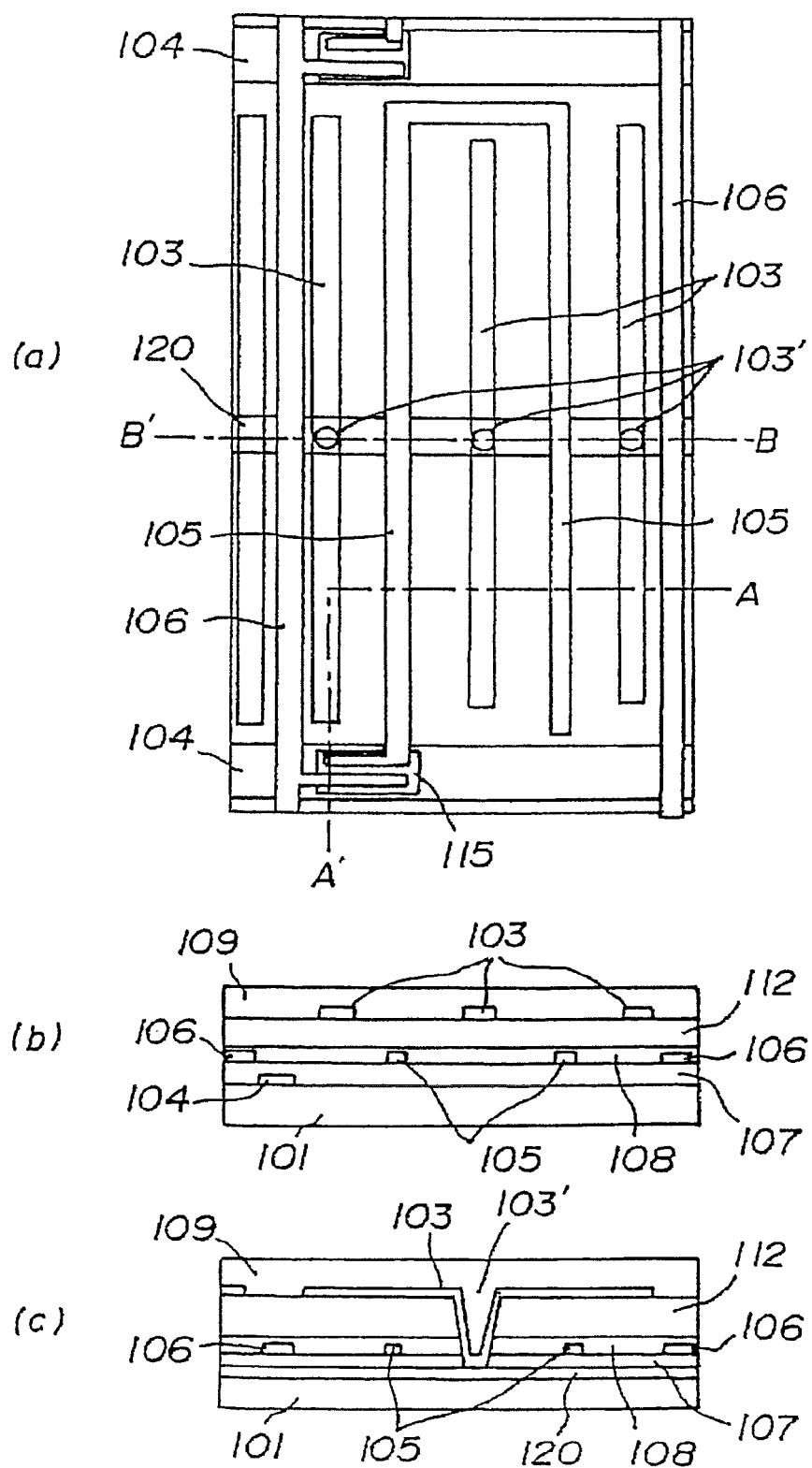
FIG. 2a is a plan view and FIGS. 2b and 2c are sectional views, respectively, showing a pixel portion for explaining the pixel structure of Embodiment 1 of the liquid crystal display according to the present invention.

FIG. 1 is a schematic section view showing almost one pixel for explaining Embodiment 1 of a liquid crystal display according to the present invention. FIGS. 2(a) to 2(c) are schematic diagrams of the active matrix substrate for explaining the structure of almost one pixel for describing Embodiment 1 of the liquid crystal display according to the present invention, in which FIG. 2(a) is a plan view, FIG. 2(b) is a section view taken along an A-A' line of FIG. 2(a), and FIG. 2(c) is a section view taken along a B-B' line of FIG. 2(a). FIG. 1 corresponds to part of the section view taken along the A-A' line of FIG. 2(a). The section views of FIG. 2(b) and FIG. 2(c) schematically show the emphasized structures of main portions and do not correspond exactly to the cut portions along the A-A' line and the B-B' line of FIG. 2(a), respectively. For example, FIG. 2(b) does not show a semiconductor film 116, and FIG. 2(c) representatively shows only part of a through-hole for connecting an opposite electrode with a common wire 120.

In the liquid crystal display device of Embodiment 1, a gate electrode (scanning signal electrode) 104 made of Cr (chromium) and the common wire (common electrode wire) 120 are disposed on a glass substrate 101 serving as the active matrix substrate. A gate insulating film 107 made of silicon nitride is formed to cover the gate electrode 104 and the common electrode wire 120. The semiconductor film 116 made of amorphous silicon or polysilicon is disposed above the gate electrode 104 through the gate insulating film 107 to function as an active layer of a thin film transistor (TFT) as an active device. A drain electrode (video signal wire) 106 made of CrMo (Chromium/Molybdenum) and a source electrode (pixel electrode) 105 are disposed to partly lie on the pattern of the semiconductor film 116. A protecting film 108 made of silicon nitride is formed to cover all of them.

In addition, as schematically shown in FIG. 2(c), a common electrode 103 connected to the common electrode wire 120 through a through-hole 103' formed to extend through the gate insulating film 107 and the protecting film 108 is disposed on an overcoat layer 112. Also, as apparent from FIG. 2(a), the common electrode 103 is formed to be drawn from the common electrode wire 120 through the through-hole 103' such that the common electrode 103 is opposite to the pixel electrode 105 in the area of one pixel in a plane.

Thus, in Embodiment 1 of the present invention, the pixel electrode 105 is disposed in a layer lower than the protecting film 108 in a layer lower than the organic protecting film 112 and the common electrode 103 is disposed on the organic protecting film 112. One pixel is formed by the plurality of areas sandwiched between the pixel electrode 105 and common electrode 103. An alignment control film 109 is formed on the surface of the active matrix substrate on which unit pixels formed as described above are arranged in matrix, that is, on the organic protecting film 112 on which the common electrode 103 is formed.

On the other hand, as shown in FIG. 1, a color filter layer 111 is disposed on the glass substrate 102 constituting the opposite substrate such that it is divided by a light shield portion (black matrix) 113 for each pixel. The color filter layer 111 and the light shield portion 113 are covered with the organic protecting film 112 made of a transparent insulating material. The alignment control film 109 is also formed on the organic protecting film 112 to constitute the color filter substrate.

These alignment control films 109 are provided with a liquid crystal alignment ability through irradiation of linearly polarized light of ultraviolet rays taken with a pile polarizer of stacked quartz plates from a high pressure mercury lamp serving as a light source. The alignment control film has a surface which is cross-linked through heating or the like.

The glass substrate 101 constituting the active matrix substrate and the glass substrate 102 constituting the opposite electrode are disposed with their surfaces on the alignment control films 109 opposite to each other. A liquid crystal layer (liquid crystal composition layer) 110' comprised of liquid crystal molecules 110 is disposed between them. A polarizing plate 114 is formed on each of the outer surfaces of the glass substrate 101 constituting the active matrix substrate and the glass substrate 102 constituting the opposite electrode.

As described above, an active matrix type liquid crystal display (that is, a TFT liquid crystal display) using thin-film transistors is formed. In the TFT liquid crystal display, the liquid crystal molecules 110 constituting the liquid composition layer 110' are aligned substantially in parallel with the surfaces of the substrates 101 and 102 disposed opposite to each other when no voltage is applied thereto, and homogeneously aligned in an initial alignment direction defined by photo-alignment processing. When a voltage is applied to the gate electrode 104 to turn on the thin film transistor (TFT), a potential difference between the pixel electrode 105 and the common electrode 103 applies an electric field 117 to the liquid crystal composition layer. The interaction between the dielectric anisotropy of the liquid crystal composition and the electric field changes the orientation of the liquid crystal molecules 11C constituting the liquid crystal composition layer to the electric field direction. At this point, the refractive index anisotropy of the liquid crystal composition layer and the effect of the polarizing plates 114 can change the light transmittance of the liquid crystal display to realize display.

The organic protecting film 112 may be formed by using a thermosetting resin such as an acrylic resin, an epoxy acrylic resin, or a polyimide resin with high insulation and transparency. The organic protecting film 112 may be formed by using a photo-curing transparent resin or an inorganic material such as a polysiloxane resin. Alternatively, the organic protecting film 112 may also serve as the alignment control film 109.

As described above, according to Embodiment 1, the liquid crystal alignment control ability of the alignment control film 109 is provided not by using the rubbing alignment processing through direct friction with a buff cloth but by using a non-contact photo-alignment process. It is thus possible to provide uniform alignment over the entire display area without local misalignment near the electrodes.

Figure 3:
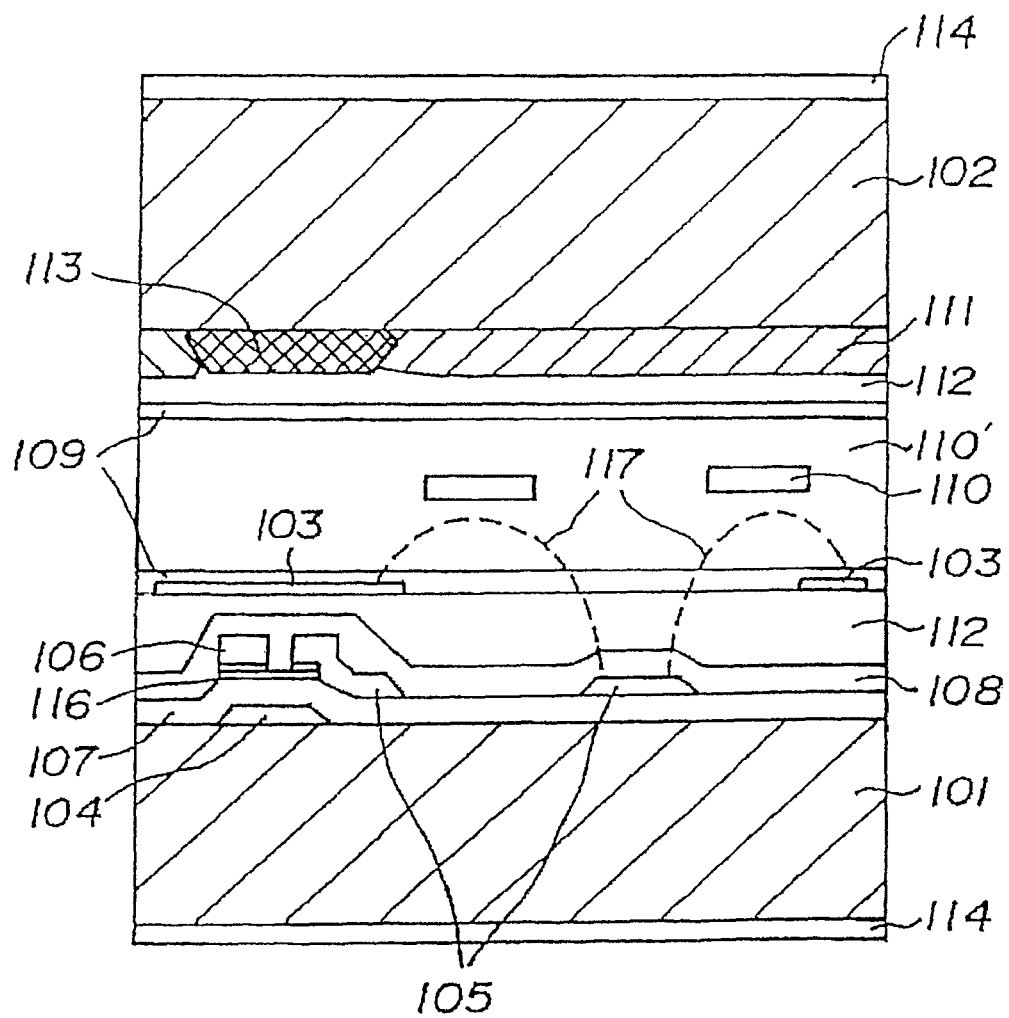
FIG. 3 is a section view showing a pixel portion for explaining the pixel structure of Embodiment 2 of the liquid crystal display according to the present invention.
Figure 4:
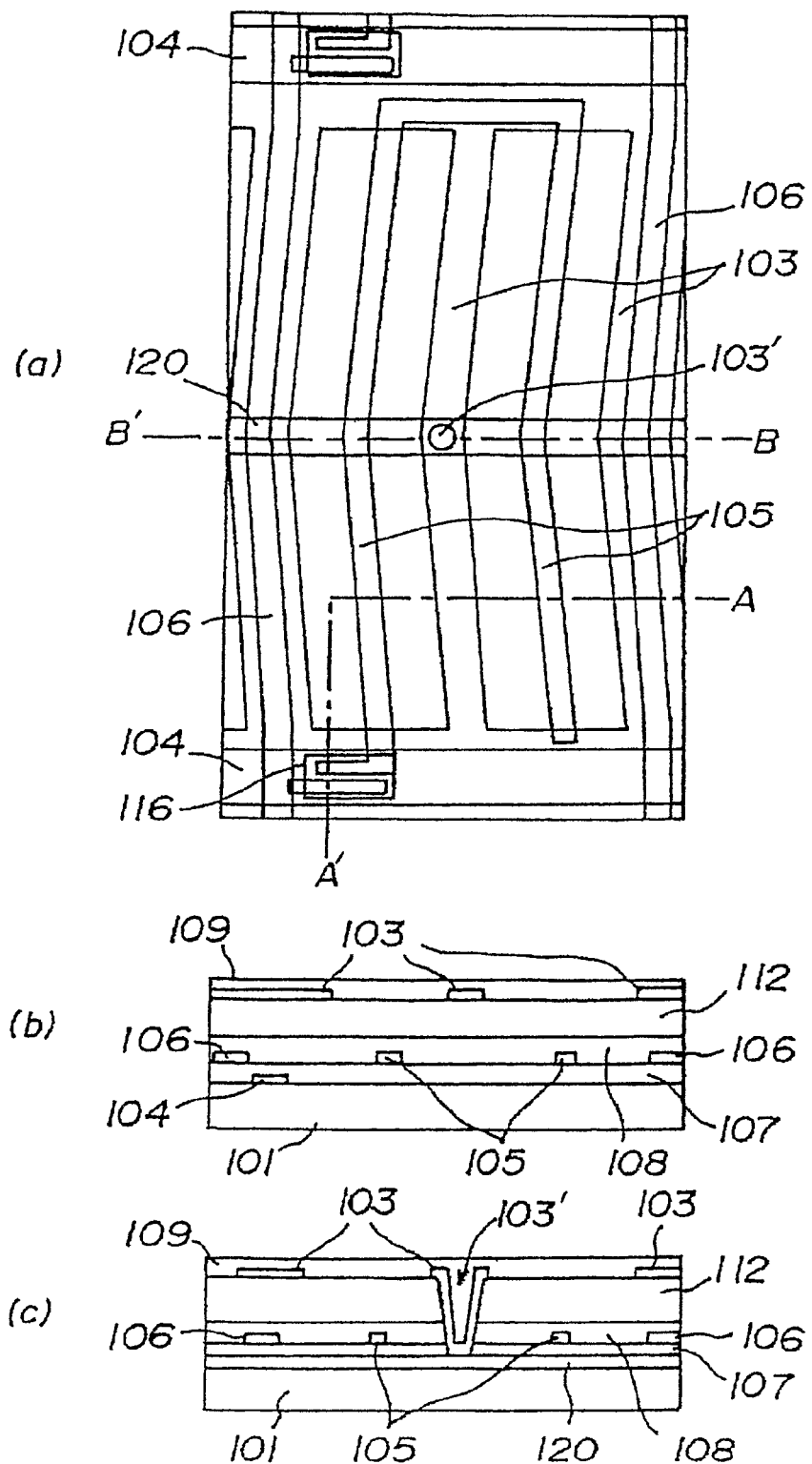
FIG. 4a is a plan view and FIGS. 4b and 4c are sectional views, respectively, showing a pixel portion for explaining the pixel structure of the liquid crystal display which is Embodiment 2 of the liquid crystal display according to the present invention.

Next, Embodiment 2 of the liquid crystal display according to the present invention will be described. FIG. 3 is a schematic section view showing almost one pixel for explaining Embodiment 2 of the liquid crystal display according to the present invention. FIGS. 4(*a*) to 4(*c*) are schematic diagrams of an active matrix substrate for explaining the structure of almost one pixel for describing Embodiment 2 of the liquid crystal display according to the present invention, in which FIG. 4(*a*) is a plan view, FIG. 4(*b*) is a section view taken along an A-A' line of FIG. 3(*a*), and FIG. 4(*c*) is a section view taken along a B-B' line of FIG. 3(*a*). FIG. 3 shows part of the section view taken along the A-A' line of FIG. 4(*a*). The section views of FIG. 4(*b*) and FIG. 4(*c*) schematically show the emphasized structures of main portions and do not correspond exactly to the cut portions along the A-A' line and the B-B' line of FIG. 2(*a*), respectively. For example, FIG. 2(*b*) does not show a semiconductor film 116.

In the liquid crystal display device of Embodiment 2 of the present invention, a gate electrode 104 made of Cr and a common electrode wire 120 are disposed on a glass substrate 101 constituting an active matrix substrate. A gate insulating film 107 made of silicon nitride is formed to cover the gate electrode 104 and the common electrode wire 120. The semiconductor film 116 made of amorphous silicon or polysilicon is disposed above the gate electrode 104 through the gate insulating film 107 to function as an active layer of a thin film transistor (TFT) serving as an active device.

A drain electrode 106 made of Chromium/Molybdenum and a source electrode (pixel electrode) 105 are disposed to partly lie on the pattern of the semiconductor film 116. A protecting film 108 made of silicon nitride is formed to cover all of them. An organic protecting film 112 is disposed on the protecting film 108. The organic protecting film 112 is formed of a transparent material such as an acrylic resin. The pixel electrode 105 is formed of a transparent electrode such as TTO ($In_2O_3$:Sn). A common electrode 103 is connected to the common electrode wire 120 through a through-hole 103' extending through the gate insulating film 107, the protecting film 108, and the organic protecting film 112.

The common electrode 103 forming a pair with the pixel electrode 105 when an electric field is applied for driving liquid crystal is formed to surround the area of one pixel in a plane. The common electrode 103 is disposed on an overcoat layer 112 on the organic protecting film 112. The common electrode 103 is disposed to hide the drain electrode 106, the scanning signal wire 104, and the thin-film transistor (TFT) serving as the active device arranged in a lower layer when viewed from above, and also serves as a light shield layer for shielding the semiconductor film 116 from light.

An alignment control film 109 is formed on the surface of the glass substrate 101 constituting the active matrix substrate on which unit pixels (one pixel) formed as described above are arranged in matrix, that is, on the organic protecting film 112 and on the common electrode 103 formed thereon. On the other hand, on a glass 102 constituting the opposite substrate, a color filter layer 111, the organic protecting film 112 formed thereon, and the alignment control film 109 are formed.

Similarly to Embodiment 2, the alignment control films 109 are provided with a liquid crystal alignment ability through irradiation of linearly polarized light of ultraviolet rays taken with a pile polarizer of stacked quartz plates from a high pressure mercury lamp serving as a light source. The alignment control film has a surface which is cross-linked through heating or the like.

The glass substrate 101 and the opposite substrate 102 are disposed with their surfaces having the alignment control films 109 formed thereon opposite to each other. A liquid crystal composition layer 110' comprised of liquid crystal molecules 110 is disposed between them. A polarizing plate 114 is formed on each of the outer surface of the glass substrate 101 and the opposite substrate 102.

As described above, in Embodiment 2 of the present invention, similarly to the abovementioned Embodiment 1, the pixel electrode 105 is disposed in a layer lower than the organic protecting film 112 and the protecting film 108, and the common electrode 103 is disposed above the pixel electrode 105 and the organic protecting film 112. When the common electrode 103 has a sufficiently low electric resistance, the common electrode 103 can also serve as the common electrode wire 120 formed in the lowermost layer. In this case, the formation of the common electrode wire 120 disposed in the lowermost layer and the associated processing of the through-hole can be omitted.

In Embodiment 2, one pixel is formed by the area surrounded by the common electrode 103 formed in a lattice form as shown in FIG. 4(a). The common electrode 103 is arranged to divide one pixel into four areas in combination with the pixel electrode 105. The pixel electrode 105 and the opposite common electrode 103 are formed of zigzag bending structures arranged in parallel with each other, and one pixel provides two or more sub-pixels. This results in a structure which cancels a hue change in a plane.

Figure 5:
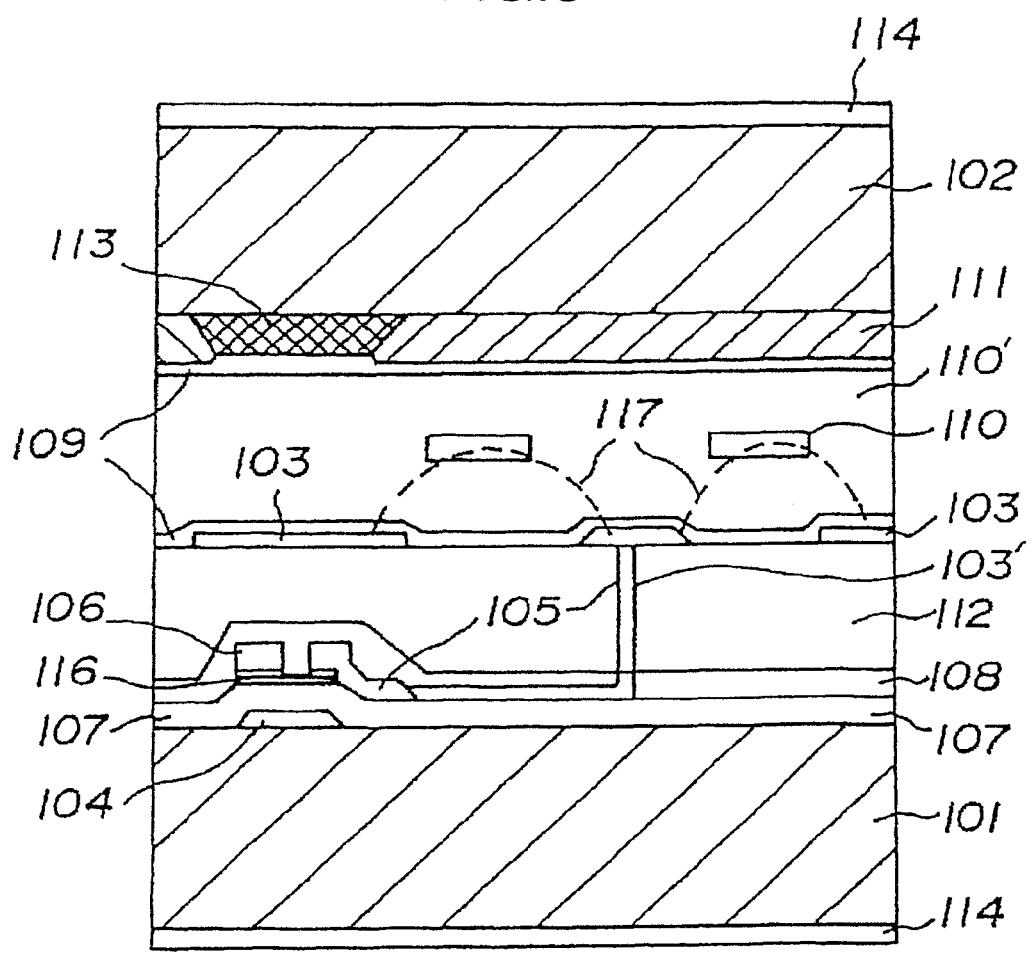
FIG. 5 is a section view showing the structure of a pixel of the liquid crystal display for explaining Example of the present invention.

FIG. 5 is a schematic section view showing almost one pixel for explaining Embodiment 3 of the liquid crystal display according to the present invention. In FIG. 5, the same reference numerals as those in the figures of the abovementioned respective embodiments correspond to the same functional portions. As shown in FIG. 5, in Embodiment 3, a pixel electrode 105 disposed in a layer lower than a protecting film 108 is pulled up on an organic protecting film 112 through a through-hole 103' and placed in the same layer as a common electrode 103. When this structure is used, a voltage for driving a liquid crystal can be reduced further.

In the TFT liquid crystal display configured as described above, liquid crystal molecules 110 constituting a liquid crystal composition layer 110' are substantially in parallel with the surfaces of glass substrates 101 and 102 disposed opposite to each other when no voltage is applied, and homogeneously aligned in an initial alignment direction defined by photo-alignment processing. When a voltage is applied to a gate electrode 104 to turn on a thin film transistor (TFT), a potential difference between the pixel electrode 105 and the common electrode 103 applies an electric field 117 to the liquid crystal composition layer 110'. The interaction between the dielectric anisotropy of the liquid crystal composition and the electric field changes the orientation of the liquid crystal molecules 110 to the electric field direction. At this point, the refractive index anisotropy of the liquid crystal composition layer 110' and the effect of polarizing plates 114 can change the light transmittance of the liquid crystal display to realize display.

In the abovementioned respective embodiments of the present invention, it is possible to provide a plurality of sets of display areas defined by the common electrode and the pixel electrode in one pixel. Since the plurality of sets formed in this manner can reduce the distance between the pixel electrode and the common electrode even when one pixel has a large size, the voltage applied to drive the liquid crystal can be reduced.

In the abovementioned respective embodiments of the present invention, no particular limitations are imposed on the material of the transparent conductive film forming at least one of the pixel electrode and the common electrode. However, in consideration of easy processing, reliability and the like, it is desirable to use a transparent conductive film of an ion-doped titanium oxide such as ITO (Indium-Tin-Oxide) or an ion-doped zinc oxide.

Generally, in the IPS scheme, it is known that an interface tilt with respect to the substrate is not required in principle unlikely the vertical electric field scheme represented by the conventional TN scheme, and more favorable viewing characteristics are achieved with a smaller interface tilt angle. A small interface tilt angle is also desirable in the light alignment control film, and specifically, an angle of one degree or smaller is effective.

Next, description will be made for the formation of the alignment control film by using the rubbing-less alignment technique for the liquid crystal alignment control film as the production process of the liquid crystal display according to the present invention. The flow of the formation process of the alignment control film according to the present invention is summarized as follows:

1. Applying and forming the alignment control film (forming a uniformly applied film over the entire display area), then
2. Firing for imidation of the alignment control film (removing a varnish solvent and promoting polyimidation with high heat resistance), then
3. Providing the liquid crystal alignment ability through irradiation of polarized light (providing a uniform alignment ability for the display area), and
4. Promoting and stabilizing the alignment ability by (heating, irradiation of infrared rays, irradiation of far infrared rays, irradiation of electron beams, irradiation of radioactive rays).

The alignment control film is formed through the above four-step process. In terms of the order of the steps 1 to 4, additional effects can be expected in the case described below.

(1) The steps 3 and 4 are processed with temporal overlap to accelerate the provision of the liquid crystal alignment ability and induce cross-link reaction and the like, allowing more effective formation of the alignment control film. In particular, when polyimide using cyclobutanetetracarboxylic acid dianhydride is used for the alignment control film, it is thought that the alignment control ability is provided by cleavage of the cyclobutane ring with the irradiation of polarized light. When the heating step is performed to overlap in time with the irradiation of polarized light, (i) maleimide is produced from the cleavage of the ring. The surface cross-linked by the maleimide is stabilized to provide a contrast and reduced after-image. (ii) Polymer is split. The low molecular part remains. Since the low molecular part is produced, it is vulnerable to stress.

The surface of the unstable alignment control film due to the carbon-carbon double bond can be stabilized by the cross-link reaction.

(2) When the heating, the irradiation of infrared rays, the irradiation of far infrared rays or the like in the step 4 is used, the abovementioned steps 2, 3, and 4 are performed to overlap in time to allow the step 4 to serve also as the imidation step 2, thereby forming the alignment control film in a short time period.

Next, specific examples of the production process of the liquid crystal display according to the present invention will be described.

EXAMPLE 1

Example 1 corresponds to the liquid crystal display described in Embodiment 1 of the present invention explained above. Detailed description will hereinafter be made for Example 1 of the present invention with reference to FIGS. 1 and 2.

In producing the liquid crystal display which is Example 1 of the present invention, a glass substrate with a thickness of 0.7 mm and having polished surfaces is used as the glass substrate 101 constituting the active matrix substrate and the glass substrate 102 constituting the opposite substrate (color filter substrate). A thin film transistor 115 formed above the glass substrate 101 is comprised of the pixel electrode 105, the signal electrode 106, the scanning electrode 104, and the amorphous silicon 116. All of the scanning electrode 104, the common electrode wire 120, the signal electrode 106, and the pixel electrode 105 were formed by patterning a chromium film. The interval between the pixel electrode 105 and the common electrode 103 was set to 7 μm. While the chromium film which had low resistance and allowed easy patterning was used for the common electrode 103 and the pixel electrode 105, an ITO film may be used to form a transparent electrode to achieve a better luminance characteristic. The gate insulating film 107 and the protecting insulating film 108 were formed of silicon nitride and each had a thickness of 0.3 μm. An acrylic resin was applied thereon, and heating processing was performed at 220° C. for an hour to form the transparent and insulating organic protecting film 112.

Next, photolithography with etch processing was performed to form the through-hole reaching the common electrode wire 120 as shown in FIG. 2(c) to form the common electrode 103 connected with the common electrode wire 120 through patterning.

The resulting structure had the pixel electrode 105 disposed between the three common electrodes 103 in the unit pixel (one pixel) as shown in FIG. 2(a), thereby forming the active matrix substrate with the number of pixels of 1024×3×768 constituted by 1024×3 (for R, G, and B) signal electrodes 106 and 768 scanning electrodes 104.

Next, as the alignment control film, polyamic acid varnish consisting of 4,4'diaminostilbene shown in a formula [33] and 1,2,3,4-cyclobutanetetracarboxylic acid dianhydride shown in a formula [34] was prepared as 5% by weight for the concentration of the resin, 40% by weight of NMP, 40% by weight of γ-butyrolactone, 15% by weight of butyl cellosolve, and formed through printing on the abovementioned active matrix substrate. Heat treatment was performed at 220° C. for 30 minutes for imidation to form the fine polyimide alignment control film 109 of approximately 70 nm.

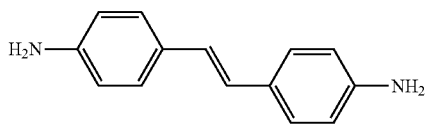

[33]

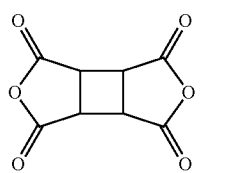

[34]

In the same manner, similar polyamic acid varnish was formed through printing on the surface of the other glass substrate 102 on which the ITO was deposited, and was subjected to heat treatment at 220° C. for 30 minutes to form the alignment control film 109 made of a fine polyimide film of approximately 70 nm.

While the substrate was heated to 200° C. by a hot plate, the polyimide alignment control film 109 was irradiated with polarized UV (ultraviolet) light in order to provide the liquid crystal alignment ability for the surface. A high pressure mercury lamp was used as a light source. The UV light of 240 nm to 380 nm was taken through an interference filter and changed by a pile polarizer of stacked quartz substrates into linearly polarized light with a polarization ratio of approximately 10:1 before irradiation with an irradiation energy of approximately 5 J/cm². As a result, the alignment direction of the liquid crystal molecules on the surface of the alignment control film was found orthogonal to the polarization direction of the irradiated polarized UV light.

Next, the two glass substrates 101 and 102 were disposed such that the respective surfaces having the alignment control films 109 with the liquid crystal alignment ability were opposite to each other and a spacer consisting of dispersed spherical polymer beads was interposed between them. A seal agent was applied to peripheral portions. In this manner, the liquid crystal display panel (referred also to as a cell) which was to serve as the liquid crystal display was assembled. The liquid crystal alignment directions on the two glass substrates were substantially in parallel with each other and formed an angle of 75° with respect to the direction of an applied electric field. The cell was injected in vacuum with a nematic liquid crystal composition A with a dielectric anisotropy $\Delta\epsilon$ of a positive value of 10.2 (1 kHz, 20° C.), a refractive index anisotropy $\Delta n$ of 0.075 (a wavelength of 590 nm, 20° C.), a twist elastic constant K2 of 7.0 pN, a nematic-isotropic phase transition temperature T (N–1) of approximately 76° C. and it was sealed by a sealing material made of an ultraviolet curing resin. The liquid crystal panel was produced with the liquid crystal layer having a thickness (gap) of 4.2 μm.

The liquid crystal display panel has a retardation ($\Delta nd$) of approximately 0.31 μm. A liquid crystal display panel of homogeneous alignment was produced by using an alignment control film and a liquid crystal composition equivalent to those used in this panel. The measurement of the pretilt angle of the liquid crystal with the crystal rotation technique showed approximately 0.2 degrees. The liquid crystal display panel was sandwiched between the two polarizing plates 114 such that one of the polarizing plates has a polarized light transmission axis substantially in parallel with the abovementioned liquid crystal alignment direction, and the other has a polarized light transmission axis orthogonal thereto. Then, a drive circuit, a backlight and the like were connected to form a module, thereby providing the active matrix type liquid crystal display. Example 1 employed the normally close characteristic in which dark display is produced at low voltage, while bright display is produced at high voltage.

Then, when the display quality of the abovementioned liquid crystal display which is Example 1 of the present invention was evaluated, high quality display with a contrast ratio of 600:1 was observed and a wide viewing angle at halftone display was observed.

Then, evaluation was performed by using an oscilloscope in combination with a photodiode in order to quantitatively measure image persistence and after-image in the liquid crystal display which is Example 1 of the present invention. First, a window pattern was displayed on the screen at the maximum luminance for 30 minutes, and then the whole screen was switched to halftone display in which after-image was most recognizable, in this case the luminance was set to 10% of the maximum luminance to evaluate the time until the edge pattern of the window pattern disappeared as an after-image relaxation time. It should be noted that the permissible after-image relaxation time is equal to or shorter than five minutes. As a result, the after-image relaxation time was one minute or shorter in a range of operating temperatures (0 to 50° C.). Also, in a visual image quality after-image test, an excellent display characteristic was found without any uneven display due to image persistence or after-image.

Conventionally, the photo-alignment can provide the alignment of liquid crystal, but it is said that anchoring energy, that is, energy for binding the aligned liquid crystal molecules to the surface of the alignment film is lower than that in the typical rubbing alignment. It is said that the low anchoring energy causes insufficient reliability of the liquid crystal display as a product. In particular, it is said that anchoring energy in an azimuth direction is more important than anchoring energy in a polar angle direction for the homogeneous alignment.

Thus, the same alignment film material as that in the liquid crystal display provided in this manner was used to form an alignment film on a glass substrate through the same process and alignment processing was performed. The same liquid crystal composition was filled to form a liquid crystal cell. A torque balance technique (Hasegawa et al, Japanese Liquid Crystal Society Conference Proceedings 3B12 (2001) p251) was used to measure the strength of twist binding between liquid crystal molecules at the interface and the surface of the alignment film, the anchoring energy A2 in the azimuth direction, and the energy was $6.0 \times 10^{-4}$ N/m.

EXAMPLE 2

In the same manner as in Example 1 except the alignment control film used in Example 2, polyamic acid comprising 1,3-dimethyl-1,2,3,4-cyclobutanetetracarboxylic acid dianhydride shown in a formula [35] as acid dianhydride and m-phenylenediamine shown in a formula [36] as a diamine compound was formed through printing on the substrate surface and subjected to firing at 230° C. for 30 minutes for imidation, thereby depositing the film with a thickness of approximately 50 nm. Then, while the substrate was heated to 200° C. by a hot plate, the surface was subjected to photo-alignment processing through light irradiation with polarized UV of krF excimer laser with a wavelength of 248 nm and nitrogen laser with a wavelength of 337 nm.

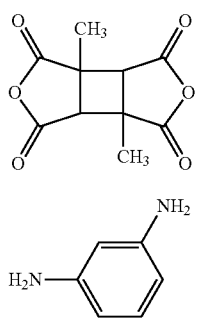

[35]

[36]

Thereafter, a nematic liquid crystal composition A was filled in the same manner as in Example 1. Annealing was then performed at 100° C. for 10 minutes. Thus, favorable liquid crystal alignment was provided in a direction substantially perpendicular to the abovementioned polarization direction of the irradiation.

In this manner, the liquid crystal panel having the liquid crystal layer with a thickness d of 4.0 μm was provided. A liquid crystal display panel of homogeneous alignment was produced by using an alignment control film and a liquid crystal composition equivalent to those used in this liquid crystal panel. The measurement of the pretilt angle of the liquid crystal with the crystal rotation technique showed approximately 0.5 degrees.

Then, when the display quality of the liquid crystal display was evaluated in the same manner as in Example 1, and high quality display was observed with a contrast ratio of more than 500:1 over the entire screen, which is substantially equivalent to that of the liquid crystal display of Example 1, and a wide viewing angle was observed at halftone display. In the same manner as in Example 1, the image persistence and after-image relaxation time of the liquid crystal display were quantitatively estimated, and the after-image relaxation time was approximately one minute in a range of operating temperatures from 0 to 50° C. Also, in the visual image quality after-image test, an excellent display characteristic equivalent to that of Example 1 was found without any uneven display due to image persistence or after-image.

COMPARATIVE EXAMPLE 1

As a Comparative Example 1 for explaining the effect of Example 2, a liquid crystal display panel was formed in the same manner as in Example 1 except the alignment control film by using polyamic acid varnish consisting of pyromellitic acid dianhydride shown in a formula [37] as acid dianhydride and p-phenylenediamine shown in a formula [38] as a diamine compound.

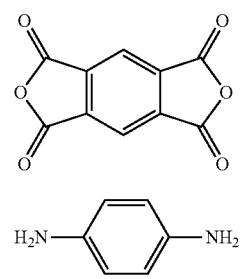

[37]

[38]

in the same manner as in Example 1, a wide viewing angle substantially equivalent to that of the liquid crystal display of Example 1 was observed, although the display with a contrast ratio of lower than 100:1 over the entire screen was observed. Similarly to Example 1, the image persistence and after-image relaxation time of the liquid crystal display were quantitatively evaluated, and the after-image relaxation time was found approximately seven minutes in a range of operating temperatures from 0 to 50° C. Also, in the visual image quality after-image Lest, the after-image relaxation time was long, and an excellent display characteristic equivalent to Example 1 was not achieved.

The value of A2 was approximately $6.5 \times 10^{-4}$ N/m.

EXAMPLE 3

A liquid crystal display panel was produced in the same manner as in Example 1 except the alignment control film by preparing polyamic acid varnish using 1,2,3,4-cyclobutane-tetracarboxylic acid dianhydride shown in a formula [39] and pyromellitic acid dianhydride shown in a formula [40] as acid dianhydride with a mole fraction of 6:4 and p-phenylenediamine shown in a formula [41] as a diamine compound. In this event, the thickness of the alignment control film was set to approximately 50 nm.

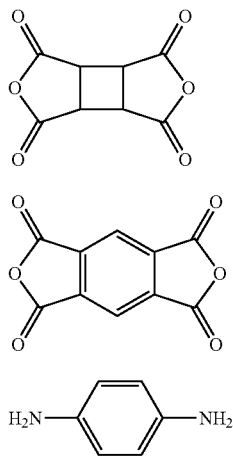

Then, when the display quality of the liquid crystal display was evaluated in the same manner as in of Example 1, high quality display with a contrast ratio of more than 500:1 was observed over the entire screen, which is substantially equivalent to that of the liquid crystal display of Example 1, and a wide viewing angle at halftone display was also observed. In addition, when the image persistence and after-image relaxation time of the liquid crystal display were quantitatively evaluated similarly to Example 1, the after-image relaxation time was approximately one minute in a range of operating temperatures from 0 to 50° C. Also, in the visual image quality after-image test, an excellent display characteristic equivalent to that in Example 1 was found without any uneven display due to image persistence or after-image.

The value of A2 was approximately $8.2 \times 10^{-4}$ N/m.

In addition, two kinds of polyamic acid varnish were prepared by setting the composition ratios of 1:1 and 4:6 for the abovementioned two kinds of acid dianhydride in the polyamic acid varnish used in the alignment control film, that is, 1,2,3,4-cyclobutanetetracarboxylic acid dianhydride and pyromellitic acid dianhydride. The respective kinds of varnish were used to produce two kinds of liquid crystal display panels. The contrast ratios of liquid crystal displays with the liquid crystal display panels were approximately 470:1 and 200:1, respectively. The after-image relaxation times were approximately 2 and 6 minutes, respectively. The display characteristic was significantly degraded in the composition ratio of 4:6 of 1,2,3,4-cyclobutanetetracarboxylic acid dianhydride and pyromellitic acid dianhydride as compared with the other case.

The value of A2 of the panel with the contrast ratio of 200:1 was approximately $2.3 \times 10^{-4}$ N/m.

COMPARATIVE EXAMPLE 2

As a comparative example for explaining the effect of Example 3, a liquid crystal display panel was formed in the same manner as in Example 1 except the alignment processing.

The alignment processing was performed as follows.

As an alignment control film, polyamic acid varnish consisting of 4,4'diaminostilbene shown in a formula [33] and 1,2,3,4-cyclobutanetetracarboxylic acid dianhydride shown in a formula [34] was prepared as 5% by weight for the concentration of the resin, 40% by weight of NMP, 40% by weight of γ-butyrolactone, 15% by weight of butyl cellosolve, and formed through printing on the abovementioned active matrix substrate. Heat treatment was performed at 220° C. for 30 minutes for imidation to form the fine polyimide alignment control film 109 of approximately 70 nm.

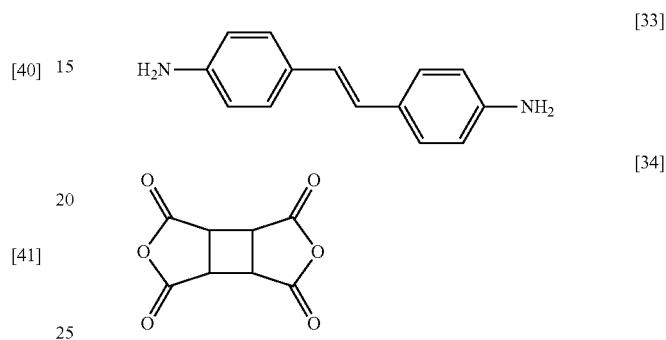

In the same manner, similar polyamic acid varnish was formed through printing on the surface of the other glass substrate 102 on which the ITO was deposited and heat treatment was performed for 220° C. for 30 minutes to form the alignment control film 109 made of a fine polyimide film of approximately 100 nm.

To provide the surface with the liquid crystal alignment ability, the polyimide alignment control film 109 was irradiated with polarized UV (ultraviolet) light. A high pressure mercury lamp was used as a light source. The UV light in a range from 240 nm to 380 nm was taken through an interference filter and changed by a pile polarizer of stacked quartz substrates into linearly polarized light with a polarization ratio of approximately 10:1 before irradiation with an irradiation energy of approximately 3 J/cm². However, at the irradiation of the polarized light, a step associated with cross-link such as heating was not performed. As a result, the alignment direction of the liquid crystal molecules on the surface of the alignment control film was found perpendicular to the polarization direction of the irradiated polarized UV light.

When the display quality thereof was evaluated in the same manner as in Example 1, a wide viewing angle substantially equivalent to that of the liquid crystal display of Example 1 was observed, but the display with a contrast ratio of lower than 100:1 over the entire screen was observed. In addition, when the image persistence and after-image relaxation time of the liquid crystal display were quantitatively evaluated similarly to Example 1, the after-image relaxation time was approximately five minute in a range of operating temperatures from 0 to 50° C. The after-image relaxation time was also long in the visual image-quality after-image test. Thus, an excellent display characteristic equivalent to that in Example 1 was not achieved.

The value of A2 was approximately $0.5 \times 10^{-4}$ N/m.

COMPARATIVE EXAMPLE 3

As a comparative example for explaining the effect of Example 3, a liquid crystal display panel was formed in the same manner as in Example 1 except the alignment processing.

As the alignment film, polyamic acid varnish consisting of pyromellitic acid dianhydride shown in a formula [37] as acid dianhydride and p-phenylenediamine shown in a formula [38] as a diamine compound was used.

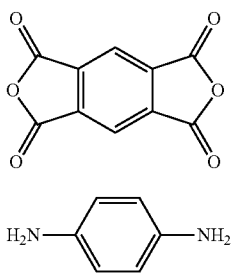

[37]

[38]

In the same manner, similar polyamic acid was formed through printing on the surface of the other glass substrate 102 and heat treatment was performed at 220° C. for 30 minutes 5o form the alignment control film 109 made of a fine polyimide film of approximately 70 nm.

To provide the surface with the liquid crystal alignment ability, the polyimide alignment control film 109 was irradiated with polarized UV (ultraviolet) light while the substrate was hated by a hot plate at 200° C. A high pressure mercury lamp was used as a light source. The UV light in a range from 240 nm to 380 nm was taken through an interference filter and changed by a pile polarizer of stacked quartz substrates into linearly polarized light with a polarization ratio of approximately 10:1 before irradiation with an irradiation energy of approximately 5 J/cm$^2$. As a result, the alignment direction of the liquid crystal molecules on the surface of the alignment control film was found perpendicular to the polarization direction of the irradiated polarized UV light.

When the display quality thereof was evaluated in the same manner as in Example 1, a wide viewing angle substantially equivalent to that of the liquid crystal display of Example 1 was observed, but the display with a contrast ratio of lower than 200:1 over the entire screen was observed. In addition, when the image persistence and after-image relaxation time of the liquid crystal display were quantitatively evaluated similarly to Example 1, the after-image relaxation time was approximately five minute in a range of operating temperatures from 0 to 50° C. The after-image relaxation time was also long in the visual image-quality after-image test. Thus, an excellent display characteristic equivalent to that in Example 1 was not achieved.

The value of A2 was approximately $0.1 \times 10^{-4}$ N/m.

EXAMPLE 4

Next, Example 4 will be described with reference to FIGS. 3 and 4 as a specific structure of the liquid crystal display which is Embodiment 2 of the present invention. In the structure of the liquid crystal display which is Example 4 of the present invention, a glass substrate with a thickness of 0.7 mm and having polished surfaces is used as the glass substrates 101 and 102. The thin film transistor 115 is comprised of the pixel electrode 105, the signal electrode 106, the scanning electrode 104, and the amorphous silicon 116. The scanning electrode 104 was formed by patterning an aluminum film, the common electrode wire 120 and the signal electrode 106 were formed by patterning a chromium film, and the pixel electrode 105 was formed by patterning an ITO film. As shown in FIG. 4(a), the electrodes except the scanning electrode 104 were formed in a zigzag bending electrode wiring pattern. The angle of the bending was set to 10 degrees. The gate insulating film 107 and the protecting insulating film 108 were made of silicon nitride, and each had a thickness of 0.3 μm.

Next, photolithography with etch processing was performed to form the cylindrical through-hole reaching the common electrode wire 120 with a diameter of approximately 10 μm as shown in FIG. 4(c), and an acrylic resin was applied thereon. Heat treatment was performed thereon at 220° C. for an hour to form the transparent and insulating interlayer insulating film 112 with a dielectric constant of approximately 4 and a thickness of approximately 1 μm. The interlayer insulating film 112 was used to planarize irregularities due to the steps of the pixel electrode 105 in the display area and the steps in the boundary of the color filter layer 111 between adjacent pixels.

Then, the thorough-hole portion was again subjected to etching to a diameter of approximately 7 μm. The common electrode 103 connected with the common electrode wire 120 was formed thereon by patterning an ITO film. At this point, the interval between the pixel electrode 105 and the common electrode 103 was set to 7 μm. The common electrode 103 was formed in a lattice form to lie above and cover the video signal wire 106, the scanning signal wire 104, and the thin film transistor 115 to surround the pixel such that it also serves as the light shield layer.

As a result, in shown in FIG. 4(a), the pixel electrode 105 was arranged between the three common electrodes 103 in the unit pixel, thereby forming the active matrix substrate with the number of pixels of 1024×3×768 constituted by 1024×3 (for R, G, and B) signal electrodes 106 and 768 scanning electrodes 104.

Next, as the alignment control film 109, polyamic acid varnish consisting of 1,2,3,4-cyclobutanetetracarboxylic acid dianhydride shown in a formula [42] and 1,4-diaminonaphthalene shown in a formula [43] was used to produce an alignment control film with a thickness of approximately 40 nm. In the alignment processing process, polarized light UV similar to that in Example 1 was irradiated with an irradiation energy of approximately 3 Jcm$^{-2}$. However, heating processing of the substrate having the alignment control film formed thereon was performed on a hot plate at approximately 150° C. simultaneously during the irradiation of the polarized UV.

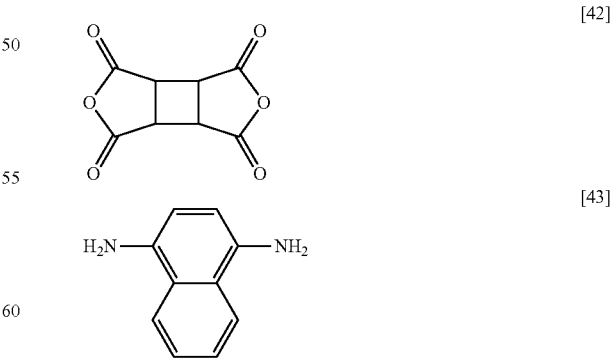

[42]

[43]

Next, the two glass substrates were disposed such that the surfaces having the alignment control films were opposite to each other and a spacer consisting of dispersed spherical polymer beads was interposed between them. A seal agent was applied to peripheral portions. In this manner, the liquid crystal display panel was assembled. The liquid crystal alignment directions on the two glass substrates were substantially in parallel with each other and formed an angle of 75° with respect to the direction of an applied electric field. The liquid crystal display panel was injected in vacuum with a nematic liquid crystal composition A with a dielectric anisotropy Δ∈ of a positive value of 1.0.2 (1 kHz, 20° C.), a refractive index anisotropy Δn of 0.075 (a wavelength of 590 nm, 20° C.), a twist elastic constant K2 of 7.0 pN, a nematic-isotropic phase transition temperature T (N–1) of approximately 76° C. and it was sealed by a sealing material made of an ultraviolet curing resin. The liquid crystal panel was produced with the liquid crystal layer having a thickness (gap) of 4.2 μm. The panel has a retardation (Δnd) of approximately 0.31 μm.

A liquid crystal display panel of homogeneous alignment was produced by using an alignment control film and a liquid crystal composition equivalent to those used in this liquid crystal display panel. The measurement of the pretilt angle of the liquid crystal with the crystal rotation technique showed approximately 0.2 degrees. The panel was sandwiched between the two polarizing plates 114 such that one of the polarizing plates has a polarized light transmission axis substantially in parallel with the abovementioned liquid crystal alignment direction, and the other has a polarized light transmission axis orthogonal thereto. Then, a drive circuit, a backlight and the like were connected to form a module, thereby providing the active matrix type liquid crystal display. Example 4 employed the normally close characteristic in which dark display is produced at low voltage, while bright display is produced at high voltage.

Next, the display quality of the liquid crystal display which is Example 4 of the present invention was estimated. The aperture ratio was higher than that of the liquid crystal display of Example 1, high quality display with a contrast ratio of 600:1 was observed, and a wide viewing angle at halftone display was also observed. In addition, in the same manner as in Example 1, the image persistence and after-image relaxation time of the liquid crystal display were quantitatively evaluated, and the after-image relaxation time was found approximately one minute in a range of operating temperatures from 0 to 50° C. Also, in the visual image quality after-image test, an excellent display characteristic equivalent to that of Example 1 was found without any uneven display due to image persistence or after-image.

In addition, when an alignment control film formed on a glass substrate in the same manner as in Example 4 was shaved to evaluate the glass transition temperature of the alignment control film with DSC (Differential Scanning Calorimetry), a clear glass transition point could not be observed in a range of temperatures from 50 to 300° C. Therefore, it is thought that the glass transition temperature of the alignment control film of Example 4 is more than 300° C. which is the upper limit of the measured temperature.

The value of A2 was approximately $8.6 \times 10^{-4}$ N/m.

EXAMPLE 5

As the alignment control film, polyamic acid varnish consisting of 1, 2, 3,4-cyclobutanetetracarboxylic acid dianhydride shown in a formula [44] and 2,6-diaminonaphthalene shown in a formula [45] was used to produce an alignment control film with a thickness of approximately 50 nm. In the alignment processing process, in the same manner as in Example 1, light from a high pressure mercury lamp was changed into polarized UV with a wavelength range from 240 nm to 310 nm and a polarization ratio of 10:1 by using an interference filter and a quartz pile polarizer before irradiation with an irradiation energy of approximately 3 J/cm². The liquid crystal display panel of Example 5 was produced in the same manner as in Example 4 except the abovementioned points. When the display quality of the liquid crystal display provided by using the liquid crystal display panel was evaluated, high quality display equivalent to that of the liquid crystal display of Example 4 was observed. A wide viewing angle at halftone display was also observed.

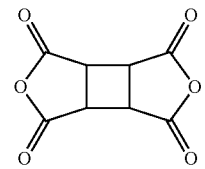

[44]

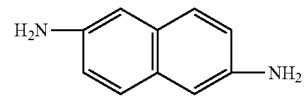

[45]

In the same manner as in Example 1 of the present invention, the image persistence and after-image relaxation time of the liquid crystal display of Example 5 were quantitatively evaluated, and the after-image relaxation time was found equal to or shorter than one minute in a range of operating temperatures from 0 to 45° C. similarly to Example 4. Also, in the visual image quality after-image test, an excellent display characteristic was achieved without any uneven display due to image persistence or after-image. In addition, an alignment control film formed on a glass substrate in the same manner as in Example 4 was shaved to evaluate the glass transition temperature of the alignment control film with the DSC (Differential Scanning Calorimetry), but a clear glass transition point could not be observed in a range of temperatures from 50 to 300° C. Therefore, it is thought that the glass transition temperature of the alignment control film of Example 5 is more than 300° C. which is the upper limit of the measured temperature.

The value of A2 was approximately $6.8 \times 10^{-4}$ N/m.

EXAMPLE 6

Instead of the spacer made of polymer beads for use in the cell gap control of the liquid crystal display, a negative photosensitive acrylic resin was applied, exposed, and developed for patterning into a column with a diameter of approximately 10 μm on the common electrode 103 serving as the light shield layer in the layer higher than the scanning wire 104 near the TFT of each pixel before the formation of the alignment control film on the active matrix substrate. Then, as the alignment control film, polyamic acid varnish was prepared by using 3,3'-dimethyl-4,4'-diaminobiphenyl shown in a formula (46) and 4,4'-diaminophenylthioether shown in a formula (47) as diamine compounds with a mole fraction of 1:2 and 1,3-difluoro-1,2,3,4-cyclobutanetetracarboxylic acid dianhydride shown in a formula (48) as acid anhydride and the film to form the film with a thickness of approximately 30 nm. In the alignment processing process, in the same manner as in Example 5, light from a high pressure mercury lamp similar to that of Example 5 was changed into polarized UV with a wavelength range from 240 nm to 310 nm and a polarization ratio of 10:1 by using an interference filter and a quartz pile polarizer before irradiation with an irradiation energy of approximately 3 J/cm². Simultaneously, a soft x-ray generator was used to irradiate soft x-rays at short distance.

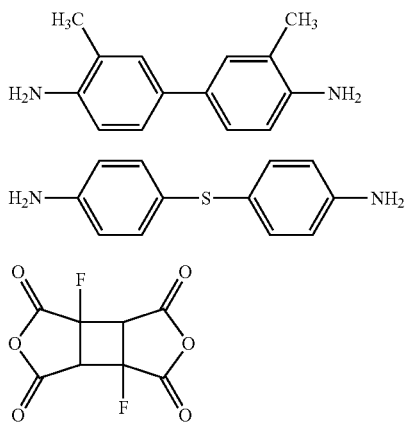

The liquid crystal display panel serving as Example 6 was produced with the same procedure except the abovementioned steps. When the display quality of the liquid crystal display which is Example 6 of the present invention was evaluated, high quality display with a higher contrast ratio than that of the liquid crystal display of Example 5 was observed. A wide viewing angle was also observed at halftone display. It is presumed that those results were achieved because of the complete elimination of light leakage which was caused by misalignment of the liquid crystal around the spacer beads distributed randomly in the pixel seen in the liquid crystal display of Example 5.

In the same manner as in Example 1 of the present invention, the image persistence and after-image relaxation time of the liquid crystal display of Example 6 were quantitatively evaluated, and the after-image relaxation Lime was found equal to or shorter than one minute similarly to Example 5. Also, in the visual image quality after-image test, an excellent display characteristic was found without any uneven display due to image persistence or after-image.

The value of A2 was approximately $1.0 \times 10^{-4}$ N/m.

EXAMPLE 7

In the same manner as in Example 4 except the alignment control film used and the alignment processing conditions, polyamic acid consisting of 9-methoxy-2,7-diaminofluorene as a diamine compound shown in a formula [49] and a 1,2,3,4-cyclobutanetetracarboxylic acid dianhydride shown in a formula [50] as acid dianhydride was formed through printing on the substrate surface and fired at 230° C. for 30 minutes for imidation to deposit the film with a thickness of approximately 50 nm. Then, while the surface was irradiated with far infrared rays, polarized UV of 337 nm from a nitrogen laser was irradiated with an irradiation energy of approximately 3 J/cm² to perform photo-alignment processing. The temperature of the alignment control film at that point was approximately 180° C.

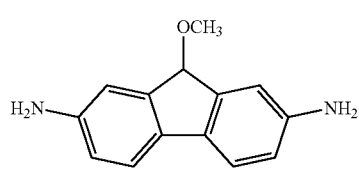

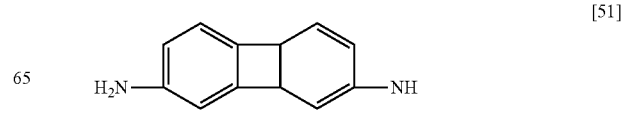

Thereafter, a nematic liquid crystal composition A was filled similarly to Example 4. Annealing was performed at 100° C. for 10 minutes. Thus, favorable liquid crystal alignment was provided in a direction substantially perpendicular to the abovementioned polarization direction of the irradiation.

In this manner, the liquid crystal display having the liquid crystal layer with a thickness d of 4.0 μm was provided. A cell of homogeneous alignment was produced by using an alignment control film and a liquid crystal composition equivalent to those used in this panel. The measurement of the pretilt angle of the liquid crystal with the crystal rotation technique showed approximately 0.3 degrees.

Then, when the display quality of the liquid crystal display which is Example 7 of the present invention was evaluated in the same manner as in Example 1, high quality display with a contrast ratio of more than 600:1 over the entire screen was observed, which is equivalent to that of the liquid crystal display of Example 1, and a wide viewing angle was also observed at halftone display. In the same manner as in Example 1 of the present invention, the image persistence and after-image relaxation time of the liquid crystal display of Example 7 were quantitatively evaluated, and the after-image relaxation time was found equal to shorter than one minute. Also, in the visual image quality after-image test, an excellent display characteristic was found without any uneven display due to image persistence or after-image.

The value of A2 was approximately $8.0 \times 10^{-4}$ N/m.

EXAMPLE 8

In the same manner as in Example 4 except the alignment control film used and the alignment processing conditions, polyamic acid consisting of 2,7-diaminobiphenylene shown in a formula [51] as a diamine compound and a 1,2,3,4-cyclobutanetetracarboxylic acid dianhydride shown in a formula [52] as acid dianhydride was formed through printing on the substrate surface and fired at 230° C. for 30 minutes for imidation to deposit the film with a thickness of approximately 20 nm. Then, while the surface was irradiated with far infrared rays, polarized UV of 337 nm from a nitrogen laser was irradiated to perform photo-alignment processing through light irradiation. The temperature of the alignment control film at that point was approximately 200° C. Thereafter, a nematic liquid crystal composition A was filled in the same manner as in Example 4. Annealing was then performed at 100° C. for 10 minutes. Thus, favorable liquid crystal alignment was provided in a direction substantially perpendicular to the abovementioned polarization direction of the irradiation.

-continued

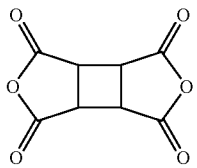
[52]

In this manner, the liquid crystal display having the liquid crystal layer with a thickness d of 4.0 μm was provided. A cell of homogeneous alignment was produced by using an alignment control film and a liquid crystal composition equivalent to those used in this panel. The measurement of the pretilt angle of the liquid crystal with the crystal rotation technique showed approximately 0.3 degrees.

Then, when the display quality of the abovementioned liquid crystal display which is Example 8 of the present invention was evaluated in the same manner in Example 1, high quality display with a contrast ratio of more than 600:1 over the entire screen was observed, which is equivalent to that of the liquid crystal display of Example 4, and a wide viewing angle was also observed at halftone display. In the same manner as in Example 1 of the present invention, the image persistence and after-image relaxation time of the liquid crystal display of Example 8 were quantitatively evaluated, and the after-image relaxation time was found equal to or shorter than two minutes. Also, in the visual image quality after-image test, an excellent display characteristic was found without any uneven display due to image persistence or after-image.

In addition, it was found that the alignment control film used in Example 8 could also provide an excellent display characteristic as described above, for example when light from a high pressure mercury lamp was changed into polarized UV of a wavelength range from 300 nm to 380 nm through an interference filter and a quartz pile polarizer before irradiation with an irradiation energy of approximately 3 J/cm$^2$, in addition to the combination of the irradiation of the far infrared rays and the irradiation of polarized UV from the nitrogen laser. Moreover, it was found that an excellent display characteristic similar to that described above could also be provided when the abovementioned polarized UV of 300 to 380 nm was irradiated while carbon dioxide gas laser of 10.5 μm and 200 mJ was irradiated.

The value of A2 was approximately $1.0 \times 10^{-4}$ N/m.

EXAMPLE 9

Example 9 will hereinafter be described with reference to FIG. 5. In producing the liquid crystal display which is Example 9 of the present invention, a glass substrate with a thickness of 0.7 mm and having polished surfaces is used as the substrates 101 and 102. The thin film transistor 115 is comprised of the source electrode 105, the signal electrode 106, the scanning electrode 104, and the amorphous silicon 116. The scanning electrode 104 was formed by patterning an aluminum film. The common electrode wire 120, the signal electrode 106, and the source electrode 105 were formed by patterning a chromium film. The gate insulating film 107 and the protecting insulating film 108 were made of silicon nitride, and each had a thickness of 0.3 μm. An acrylic resin was applied thereon. Heat treatment was performed thereon at 220° C. for an hour to form the transparent and insulating organic protecting film 112 with a dielectric constant of approximately 4 and a thickness of approximately 1.0 μm.

The organic protecting film 112 was used to planarize irregularities due to the steps of the pixel electrode 105 in the display area and the steps between adjacent pixels.

Next, photolithography with etch processing was performed to form the cylindrical through-hole reaching the source electrode 105 with a diameter of approximately 10 μm as shown in FIG. 5. The pixel electrode 105 connected with the source electrode 105 was formed thereon by patterning an ITO film. For the common electrode wire 120, a cylindrical through-hole was formed with a diameter of approximately 10 μm, and an ITO film was patterned thereon to form the common electrode 103. At this point, the interval between the pixel electrode 105 and the common electrode 103 was set to 7 μm. The electrodes except the scanning electrode 104 were formed in a zigzag bending electrode wiring pattern. The angle of the bending was set to 10 degrees. The common electrode 103 was formed in a lattice form to lie above and cover the video signal wire 106, the scanning signal wire 104, and the thin film transistor 115 to surround the pixel such that it also serves as a light shield layer.

As a result, similarly to Example 4 except the two through-holes formed in the unit pixel, the pixel electrode 105 was disposed between the three common electrodes 103 to form the active matrix substrate with the number of pixels of 1024× 3×768 constituted by 1024×3 (for R, G, and B) signal electrodes 106 and 768 scanning electrodes 104.

As described above, in the same manner as in Example 4 except the pixel structure and the alignment control film used, the liquid crystal display of Example 9 was produced as shown in FIG. 5. For the alignment control film used in Example 9, polyamic acid varnish formed by combining 2, 6-diamino, 9,10-dimethylanthracene shown in a formula [53] and 4,4-diaminobenzophenone shown in a formula [54] as diamine with a mole fraction of 2:1 and 1,2,3,4-cyclobutanetetracarboxylic acid dianhydride shown in a formula [55] and 1,2,3,4-cyclobutanetetracarboxylic acid dianhydride shown in a formula [56] with a mole fraction of 1:2 was used to form the alignment control film with a thickness of approximately 20 nm.

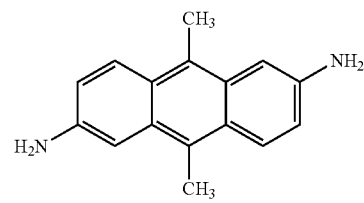
[53]

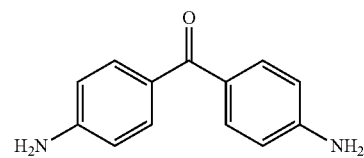
[54]

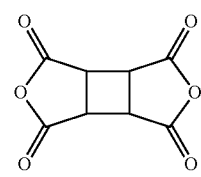
[55]

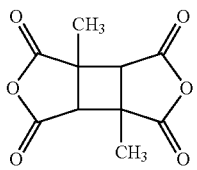

[56]

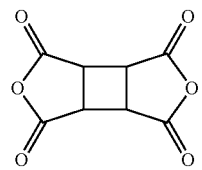

[58]

Then, when the display quality of the liquid crystal display which is Example 9 of the present invention was evaluated, high quality display equivalent to the liquid crystal display of Example 1 was observed and a wide viewing angle at halftone display was observed. Next, in the same manner as in Example 1 of the present invention, the image persistence and after-image relaxation time of the liquid crystal display of Comparative Example 1 were quantitatively evaluated, and the after-image relaxation time was found equal to shorter than one minute. Also, in the visual image quality after-image test, an excellent display characteristic was found without any uneven image due to image persistence or after-image.

As shown in FIG. 5, when the pixel electrode directly connected to the TFT is formed closest to the surface of the substrate and the thin alignment control film is formed thereon, normal rubbing alignment processing may cause charging due to friction, and in some cases, the TFT device may be damaged through the pixel electrode near the surface. In such a case, the rubbing-less photo-alignment processing as Example 9 is greatly effective.

The value of A2 was approximately $8.1 \times 10^{-4}$ N/m.

EXAMPLE 10

Figure 6:
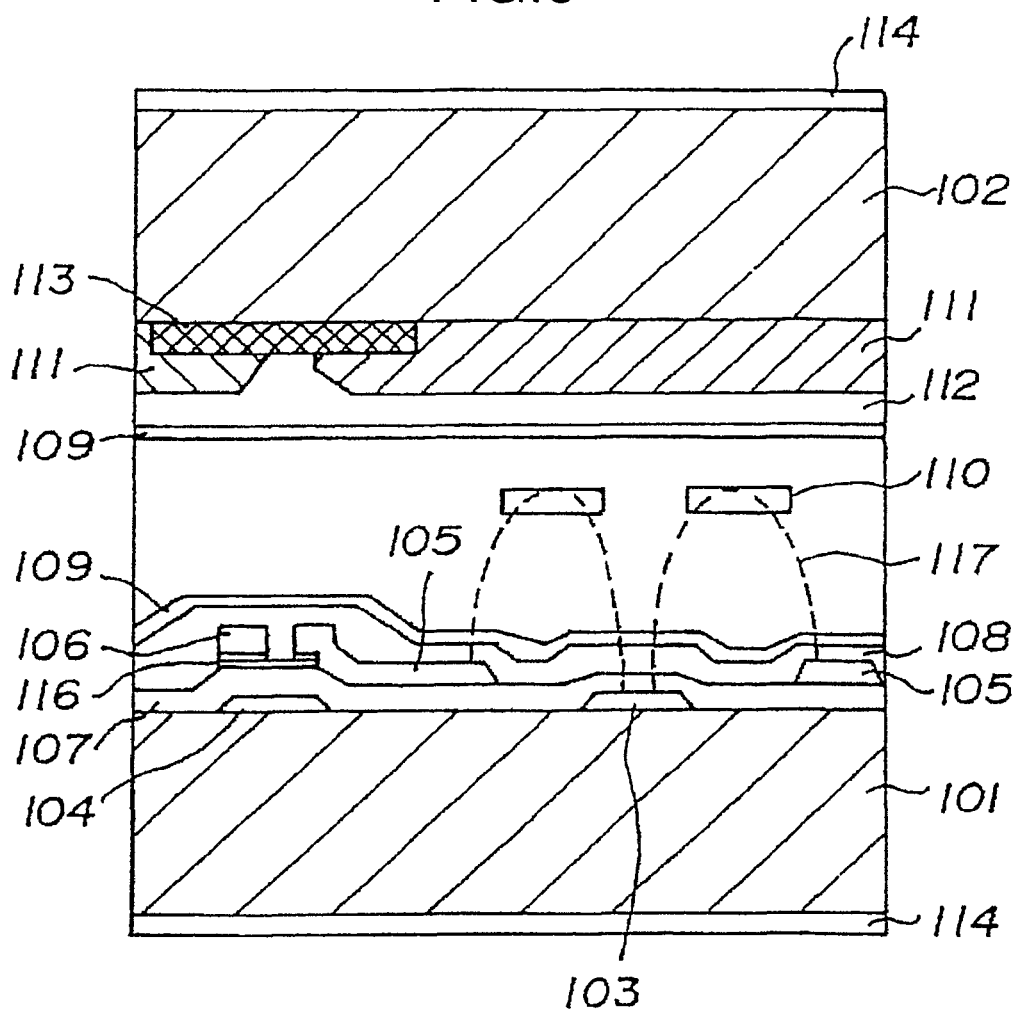
FIG. 6 is a section view showing the structure of a pixel of the liquid crystal display for explaining Example of the present invention.

FIG. 6 is a schematic section view showing almost one pixel for explaining Example 10 of the liquid crystal display according to the present invention. In producing the liquid crystal display of Example 10, a glass substrate with a thickness of 0.7 mm and having polished surfaces is used as the glass substrates 101 and 102. The thin film transistor 115 is comprised of the pixel electrode 105, the signal electrode 106, the scanning electrode 104, and the amorphous silicon 116. All of the scanning electrode 104, the common electrode wire 120, the signal electrode 106, the pixel electrode 105, and the common electrode 103 were formed by patterning a chromium film. The interval between the pixel electrode 105 and the common electrode 103 was set to 7 μm. The gate insulating film 107 and the protecting insulating film 108 were formed of silicon nitride and each had a thickness of 0.3 μm. As the alignment control film, polyamic acid varnish consisting of 9,10-diaminoanthracene shown in a formula [57] as a diamine compound and 1,2,3,4-cyclobutanetetracarboxylic acid dianhydride shown in a formula [58] as acid dianhydride was formed on the substrate surface through printing and fired at 230° C. for 30 minutes for imidation to deposit the film with a thickness of approximately 20 nm.

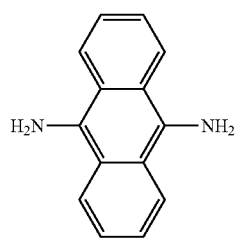

[57]

Thereafter, while the surface was irradiated in vacuum with electron beams at 5 eV and approximately 0.5 μC/cm², light from a high pressure mercury lamp was changed through an interference filter and a quartz pile polarizer into polarized UV with a wavelength range from 220 nm to 380 nm and was irradiated with an irradiation energy of approximately 3 J/cm² to perform photo-alignment processing. As a result, the active matrix substrate was formed with the number of pixels of 1024×3×768 constituted by 1024×3 (for R, G, and B) signal electrodes 106 and 768 scanning electrodes 104. As described above, similarly to Example 1 except the pixel structure, the liquid crystal display of Example 10 as shown in FIG. 6 was produced.

When the display quality of the liquid crystal display of Example 10 was evaluated, high quality display equivalent to the liquid crystal display of Example 1 was observed and a wide viewing angle at halftone display was observed. Next, in the same manner as in Example 1 of the present invention, the image persistence and after-image relaxation time of the liquid crystal display of Example 10 were quantitatively evaluated, and the after-image relaxation time was found equal to shorter than two minutes. Also, in the visual image quality after-image test, defective display due to image persistence or after-image was not observed. In addition, when polyamic acid varnish combined by introducing 1,5-diethyl-9,10-diamineoanthracene shown in a formula [59] which is a derivative of the diamine compound used in Example 1.0 with a mole fraction of 50% was used, an equivalent excellent display characteristic was provided with an irradiation energy of polarized UV of approximately 2 J/cm².

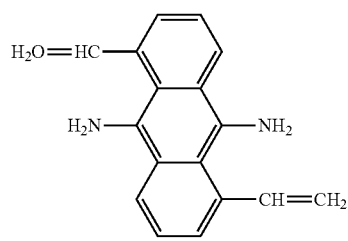

[59]

The value of A2 was approximately $6.0 \times 10^{-4}$ N/m.

EXAMPLE 11

In the same manner as in Example 10 except the composition of the alignment control film used, the formation of the alignment control film, and the alignment processing process, polyamic acid varnish consisting of 2,7-diaminophenanthrene shown in a formula [60] as a diamine compound of the alignment control film of Example 11 and a 1,2,3,4-cyclobutanetetracarboxylic acid dianhydride shown in a formula 161) as acid dianhydride was formed through printing on the substrate surface. Labeling was performed through heat processing at 90° C. for two minutes to deposit the film with a thickness of approximately 35 nm. Then, while the surface was irradiated with far infrared rays and the film surface was held at approximately 230° C., light from a high pressure mercury lamp was changed through an interference filter and a quartz pile polarizer into polarized UV with a wavelength range from 220 nm to 380 nm and was irradiated with an irradiation energy of approximately 3 J/cm² to perform photo-alignment processing. The thickness of the processed alignment control film was approximately 25 nm.

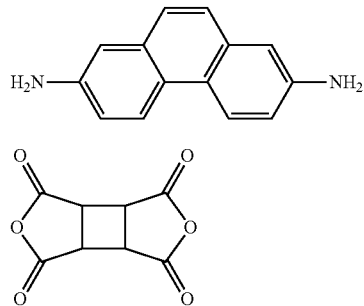

[60]

[61]

Then, the liquid crystal display of Example 11 as shown in FIG. 6 was produced similarly to Example 10 and a nematic liquid crystal composition A was filled. Annealing was then performed at 100° C. for 10 minutes. Thus, favorable liquid crystal alignment was provided in a direction substantially perpendicular to the abovementioned polarization direction of the irradiation. In this manner, the liquid crystal display having the liquid crystal layer with a thickness d of 4.0 μm was provided. A cell of homogeneous alignment was produced by using an alignment control film and a liquid crystal composition equivalent to those used in this panel. The measurement of the pretilt angle of the liquid crystal with the crystal rotation technique showed approximately 0.1 degrees.

Then, when the display quality of the liquid crystal display of Example 11 was evaluated in the same manner as in Example 1, light leakage due to defective alignment near the electrode steps seen typically in the rubbing alignment processing was not found and high quality display was observed with a contrast ratio of more than 600:1 over the entire screen, which is equivalent to that of the liquid crystal display of Example 1, and a wide viewing at halftone display was also observed. In the same manner as in Example 1, the image persistence and after-image relaxation time of the liquid crystal display of Example 11 were quantitatively evaluated, and the after-image relaxation time was found equal to shorter than one minute. Also, in the visual image quality after-image test, an excellent display characteristic was found without any uneven display due to image persistence or after-image.

The value of A2 was approximately 7.2×10⁻⁴ N/m.

EXAMPLE 12

In the same manner as in Example 9 except the composition of the alignment control film used, the formation of the alignment control film, and the alignment processing process, polyamic acid varnish consisting of 9,10-diaminoanthracene shown in a formula [62] as a diamine compound of the alignment control film of Example 12 and a 1,2,3,4-cyclobutane-tetracarboxylic acid dianhydride shown in a formula [63] as acid dianhydride was formed through printing on the substrate surface. Labeling was performed through heat processing at 90° C. for 2 minutes to deposit the film with a thickness of approximately 30 nm. Then, while the surface was irradiated with far infrared rays and the film surface was held at approximately 240° C., light from a high pressure mercury lamp was changed through an interference filter and a quartz pile polarizer into polarized UV with a wavelength range from 220 nm to 280 nm and irradiated with an irradiation energy of approximately 3 J/cm² to perform imidation burning processing and photo-alignment processing. The thickness of the processed alignment control film was approximately 26 nm.

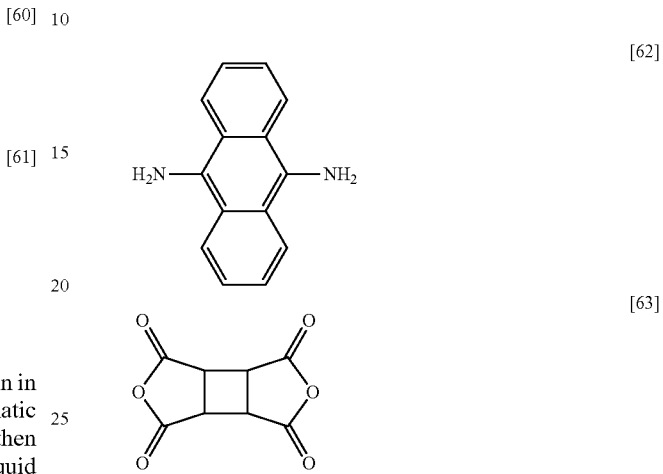

[62]

[63]

Then, the liquid crystal display of Example 12 as shown in FIG. 5 was produced in the same manner as in Example 9 and a nematic liquid crystal composition A was filled. Annealing was performed at 100° C. for 10 minutes. Thus, favorable liquid crystal alignment was provided in a direction substantially in parallel with the abovementioned polarization direction of the irradiation. In this manner, the liquid crystal display having the liquid crystal layer with a thickness d of 4.0 μm was provided. A cell of homogeneous alignment was produced by using an alignment control film and a liquid crystal composition equivalent to those used in this panel. The measurement of the pretilt angle of the liquid crystal with the crystal rotation technique showed approximately 0.1 degrees.

Then, when the display quality of the liquid crystal display which is Example 7 of the present invention was evaluated in the same manner as in Example 1, light leakage due to defective alignment near the electrode steps seen typically in the rubbing alignment processing was not found and high quality display was observed with a contrast ratio of more than 600:1 over the entire screen, which is equivalent to that of the liquid crystal display of Example 1, and a wide viewing angle at halftone display was observed. In the same manner as in Example 1, when the image persistence and after-image relaxation time of the liquid crystal display of Example 12 were quantitatively evaluated, the after-image relaxation time was equal to shorter than one minute in a range of operating temperatures from 0 to 50° C. Also, in the visual image quality after-image test, an excellent display characteristic was found without any uneven display due to image persistence or after-image.

EXAMPLE 13

Figure 7:
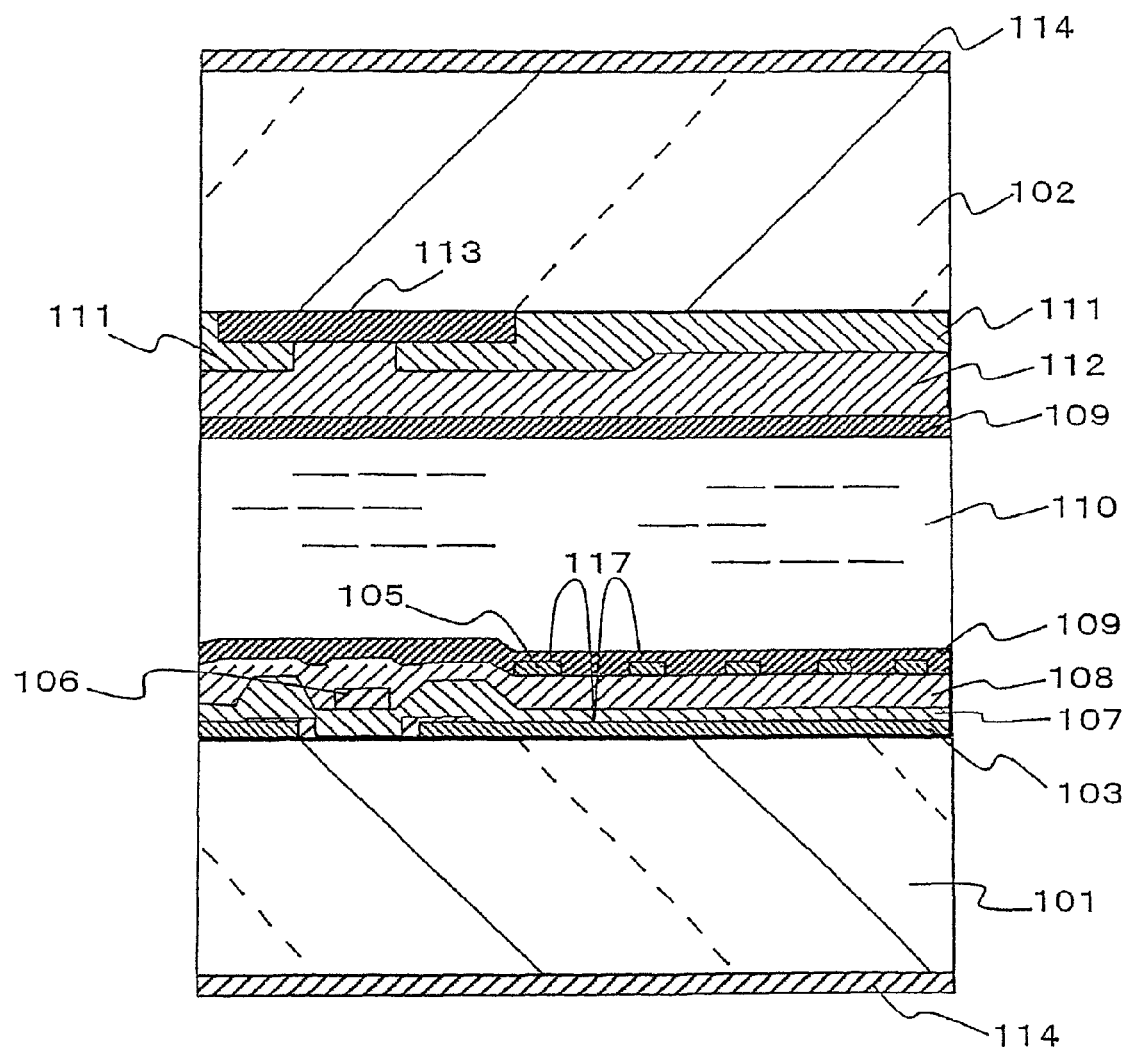
FIG. 7 is a section view showing a pixel portion for explaining the pixel structure of the liquid crystal display which is Embodiment 4 of the liquid crystal display according to the present invention.

Next, Example 13 will be described with reference to FIGS. 7 and 8 as the specific structure of the liquid crystal display which is Embodiment 4 of the present invention.

In producing the liquid crystal display which is Example 13 of the present invention, a glass substrate with a thickness of 0.7 mm and having polished surfaces is used as the substrate 101. On the substrate 101, the insulating film 107 for preventing the short circuit of the electrodes 103, 105, 106, and 104, the thin film transistor 115, and the protecting insulating film 108 for protecting the thin film transistor 115 and the electrodes 105 and 106 are formed to provide the TFT substrate.

Figure 8:
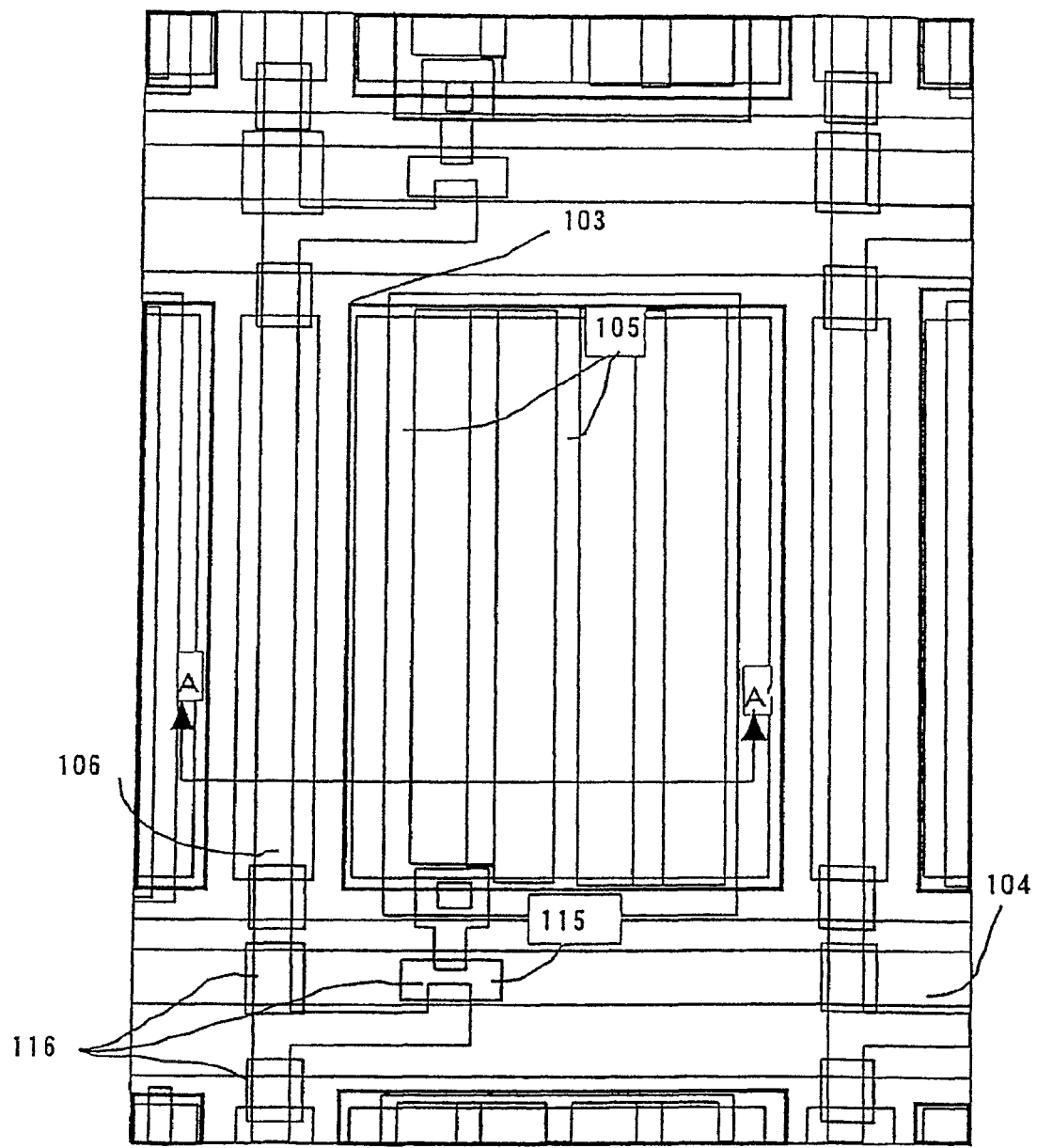
FIG. 8 is a plan view showing a pixel portion for explaining the pixel structure of the liquid crystal display which is Embodiment 4 of the liquid crystal display according to the present invention.

FIG. 8 shows the structure of the thin film transistor 115 and the electrodes 103, 105, and 106.

The thin film transistor 115 is comprised of the pixel electrode 105, the signal electrode 106, the scanning electrode 104, and the amorphous silicon 116. The scanning electrode 104 was formed by patterning an aluminum film. The signal electrode 106 was formed by patterning a chromium film. The common electrode 103 and the pixel electrode 105 were made by patterning an ITO film.

The insulating film 107 and the protecting insulating film 108 were made of silicon nitride, and had thicknesses of 0.2 μm and 0.3 μm, respectively. A capacitive element is formed as the structure in which the pixel electrode 105 and the common electrode 103 sandwich the insulating films 107, 108.

The pixel electrode 105 is arranged in an overlapping form in the layer higher than the common electrode 103 in a uniform shape. The number of pixels is 1024×3×768 constituted by 1024×3 (for R, G, and B) signal electrodes 106 and 768 scanning electrodes 104.

On the substrate 102, the color filter 111 with the black matrix 113 of the structure similar to the liquid crystal display which is Example 1 of the present invention was formed to provide the opposite color filter substrate.

Next, as the alignment control film, polyamic acid varnish consisting of 4, 4'diaminodiphenylamine and 1,3-dichloro-1, 2,3,4-cyclobutanetetracarboxylic acid dianhydride was prepared as 5% by weight for the concentration of the resin, 40% by weight of NMP, 40% by weight of γ-butyrolactone, 15% by weight of butyl cellosolve, and formed through printing on the abovementioned active matrix substrate. Heat treatment was performed at 220° C. for 30 minutes for imidation to form the fine polyimide alignment control film 109 of approximately 70 nm.

In the same manner, similar polyamic acid varnish was also formed through printing on the surface of the other glass substrate 102 on which the ITO was deposited. Heat treatment was performed at 220° C. for 30 minutes to form the polyimide alignment control film 109 made of the fine polyimide film of approximately 70 nm. To provide the liquid crystal alignment ability for the surface, the polyimide alignment control film 109 was irradiated with polarized UV (ultraviolet rays) light while the surface was irradiated with far infrared rays. A high pressure mercury lamp was used as a light source. The UV light in a range from 240 nm to 380 nm was taken through an interference filter and changed by a pile polarizer of stacked quartz substrates into linearly polarized light with a polarization ratio of approximately 10:1 before irradiation with an irradiation energy of approximately 5 J/cm². The temperature of the alignment control film at this point was approximately 120° C.

As a result, the alignment direction of the liquid crystal molecules on the surface of the alignment control film was found perpendicular to the polarization direction of the irradiated polarized UV light.

The alignment directions of the alignment control films 109 on the TFT substrate and the color filter substrate were substantially in parallel with each other and formed an angle of 15 degrees with respect to the direction of the applied electric field 117. Polymer beads with an average diameter of 4 μm were dispersed as a spacer between the substrates, and the liquid crystal 110 was sandwiched between the TFT substrate and the color filter substrate. The liquid crystal composition A identical to that of Example 1 was used as the liquid crystal 110.

The two polarizing plates 114 for sandwiching the TFT substrate and the color filter substrate were arranged as crossed nicols. The normally close characteristic was employed in which a dark state was shown at low voltage and a bright state was shown at high voltage.

Since the structure of the system for driving the liquid crystal display which is Example 13 of the present invention is similar to that of Example 1, the details of the structure are omitted.

Then, when the display quality of the liquid crystal display which is Example 13 of the present invention was estimated, the aperture ratio was higher than that of the liquid crystal display of Example 1, high quality display with a contrast ratio of 650:1 was observed, and a wide viewing angle at halftone display was also observed. In addition, in the same manner as in Example 1 of the present invention, the image persistence and after-image relaxation time of the liquid crystal display were quantitatively evaluated, the after-image relaxation time was approximately one minute in a range of operating temperatures from 0 to 50° C. Also, in the visual image quality after-image test, an excellent display characteristic equivalent to that of Example 1 was found without any uneven display due to image persistence or after-image.

In addition, when the anchoring energy A2 in the azimuth direction at the interface between the liquid crystal and the alignment film was evaluated in the same manner as in Example 1, the value equal to or higher than approximately $1.0 \times 10^{-3}$ N/m was achieved.

INDUSTRIAL APPLICABILITY

As described above, according to the present invention, in the liquid crystal display of the IPS scheme, it is possible to prevent the liquid crystal display capable of solving the inherent problem of the small production margin in the alignment processing, reducing the occurrence of defective display due to variations in the initial alignment direction, realizing the stable liquid crystal alignment, providing excellent mass productivity, and having high image quality with a higher contrast ratio.

The invention claimed is:

1. An photo alignment film material for an IPS type liquid crystal display device, adapted to be an alignment control film of a liquid crystal display to drive a liquid crystal with an electric field arising between a pair of electrodes formed on a substrate, comprising a polyamic acid or polyimide that includes cyclobutanetetracarboxylic acid dianhydride and/or its derivative and aromatic diamine; and wherein the cyclobutanetetracarboxylic acid dianhydride and/or its derivative is a compound represented by a formula [1]:

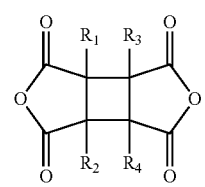

[1]

where $R_1$, $R_2$, $R_3$, and $R_4$ of the compound of the formula [1] each independently represent a hydrogen atom, a fluorine atom, an alkyl group or alkoxyl group with a carbon number of 1 to 6, with the proviso that at least one of $R_1$, $R_2$, $R_3$, and $R_4$ of the compound of formula [1] is not hydrogen, wherein the aromatic diamine compound contains at least one of compounds selected from a group of compounds consisting of ones represented by formulas [2] to [16]:

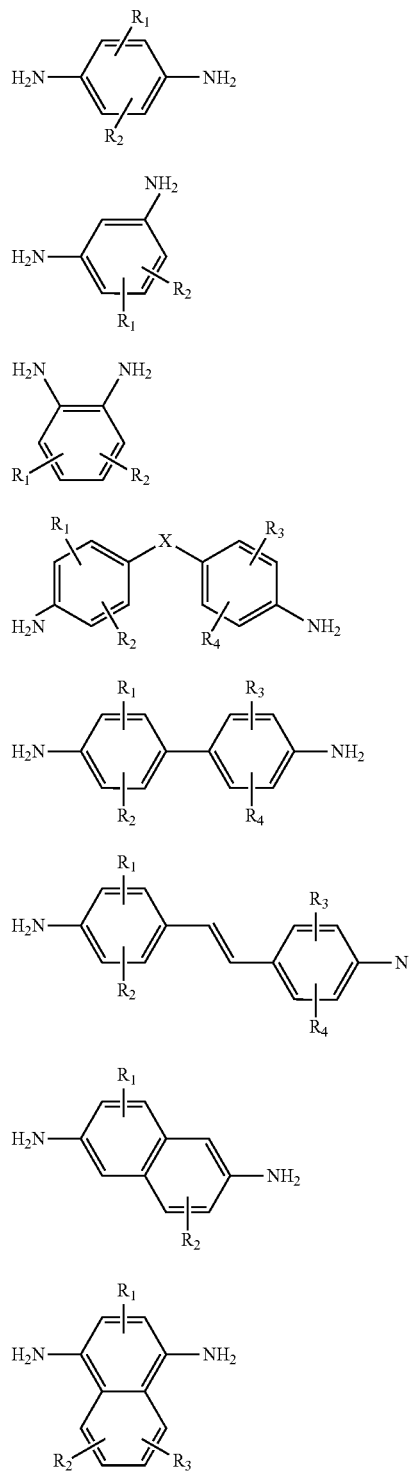

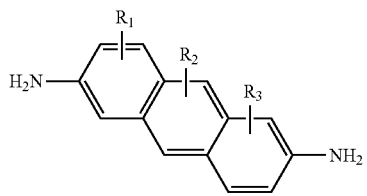

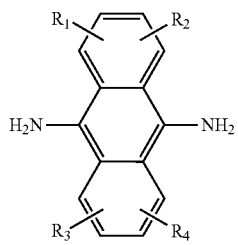

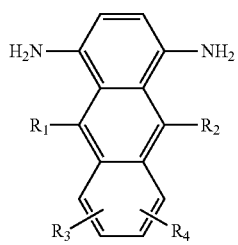

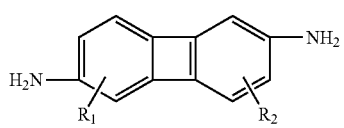

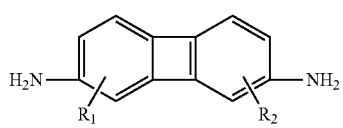

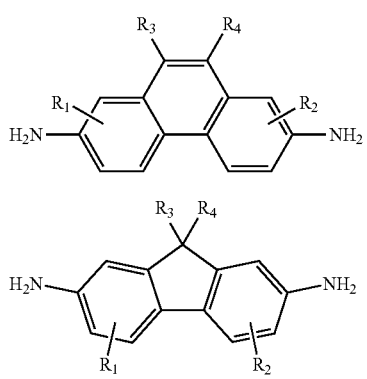

where $R_1$, $R_2$, $R_3$ and $R_4$ of the compounds represented by formulas [2] to [16] each independently represent a hydrogen atom, a fluorine atom, an alkyl group or alkoxyl group with a carbon number of 1 to 6, or vinyl group
{—$(CH_2)_m$—CH=$CH_2$, m=0, 1, 2} or a group represented by {—$(CH_2)_n$—C≡CH, n=0, 1, 2}, and in the formula [5], X represents a bond group —S—, —CO—, or —NH—.

2. The photo alignment film material for an IPS type liquid crystal display device according to claim 1, wherein said alignment control film is polyamic acid or polyimide containing at least 50% of a repeated structure of polyamic acid or polyimide comprising said cyclobutanetetracarboxylic acid dianhydride and/or its derivative and said aromatic diamine.

3. The photo alignment film material for an IPS type liquid crystal display device according to claim 1, having a glass transition temperature equal to or higher than 250° C.

4. The photo alignment film material for an IPS type liquid crystal display device according to claim 1, wherein said polyamic acid or polyimide is a photoreactive polyamic acid or polyimide.

5. The photo alignment film material for an IPS type liquid crystal display device according to claim 1, said film having been subjected to alignment processing by irradiating the film with polarized light having a wavelength in a range of 200 to 400 nm.

6. The alignment control film according to claim 5, wherein said alignment processing further comprises applying at least one of heating, irradiation of infrared rays, irradiation of far infrared rays, irradiation of electron beams and irradiation of radioactive rays when irradiating the film with the polarized light.

7. The photo alignment film material for an IPS type liquid crystal display device according to claim 1, adapted to be an alignment control film of a liquid crystal display having an electric field parallel to said substrate.

8. The photo alignment film material for an IPS type liquid crystal display device according to claim 1, wherein the alignment control film has a thickness of from 1 nm to 100 nm.

9. A varnish comprising the photo alignment film material according to claim 1 mixed with a solvent.

10. The photo alignment film material for an IPS type liquid crystal display device according to claim 8, wherein said thickness is 1 to 30 nm.

11. The photo alignment film material for an IPS type liquid crystal device according to claim 1, wherein the cyclobutanetetracarboxylic acid dianhydride has the following structure:

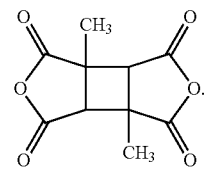 [SMILES: CC12C(=O)OC(=O)C1C1(C)C(=O)OC(=O)C21]

12. The photo alignment film material for an IPS type liquid crystal device according to claim 1, wherein the aromatic diamine compound has the following structure:

* * * * *